United States Patent [19]

Clausen et al.

[11] Patent Number: 4,498,113
[45] Date of Patent: Feb. 5, 1985

[54] APPARATUS AND METHOD FOR CLEANING A VIDEO PLAYER/RECORDER

[75] Inventors: Eivind Clausen; James D. Allsop, both of Bellingham, Wash.

[73] Assignee: Allsop, Inc., Bellingham, Wash.

[21] Appl. No.: 332,333

[22] Filed: Dec. 21, 1981

Related U.S. Application Data

[63] Continuation-in-part of Ser. No. 253,943, Apr. 14, 1981, abandoned, which is a continuation-in-part of Ser. No. 223,025, Jan. 6, 1981, Pat. No. 4,387,411, which is a continuation-in-part of Ser. No. 109,650, Jan. 4, 1980, abandoned.

[51] Int. Cl.³ .............................................. G11B 5/41
[52] U.S. Cl. .................................... 360/128; 360/85; 360/95; 360/137
[58] Field of Search .................. 360/128, 85, 95, 137; 15/210 R, DIG. 12

[56] References Cited

U.S. PATENT DOCUMENTS

| | | |
|---|---|---|
| 3,647,990 | 3/1972 | Eul, Jr. et al. ...................... 360/128 |
| 3,697,679 | 10/1972 | Hathaway ............................. 360/85 |
| 3,902,680 | 9/1975 | Neff ................................... 360/85 X |
| 3,931,643 | 1/1976 | Kuroe ................................. 360/128 |
| 3,964,104 | 6/1976 | Herron et al. ...................... 360/128 |
| 4,122,506 | 10/1978 | Kubo ................................. 360/95 X |
| 4,141,053 | 2/1979 | Kara ................................... 360/128 |
| 4,211,580 | 7/1980 | Vowles ........................... 360/137 X |

FOREIGN PATENT DOCUMENTS

| | | |
|---|---|---|
| 2311321 | 9/1973 | Fed. Rep. of Germany ........ 360/85 |
| 2301533 | 8/1974 | Fed. Rep. of Germany ...... 360/128 |
| 1233242 | 10/1960 | France ................................ 360/128 |
| 52-75426 | 6/1977 | Japan ................................. 360/128 |
| 2073470 | 10/1981 | United Kingdom ................ 360/128 |

*Primary Examiner*—John H. Wolff
*Attorney, Agent, or Firm*—Hughes, Barnard & Cassidy

[57] ABSTRACT

A cleaning device comprising a cassette housing and a cleaning ribbon mounted on spools within the housing. With the housing inserted into a video unit, the guide members of the unit move the cleaning ribbon outwardly into an engaged position to clean the operating components of the video unit.

31 Claims, 29 Drawing Figures

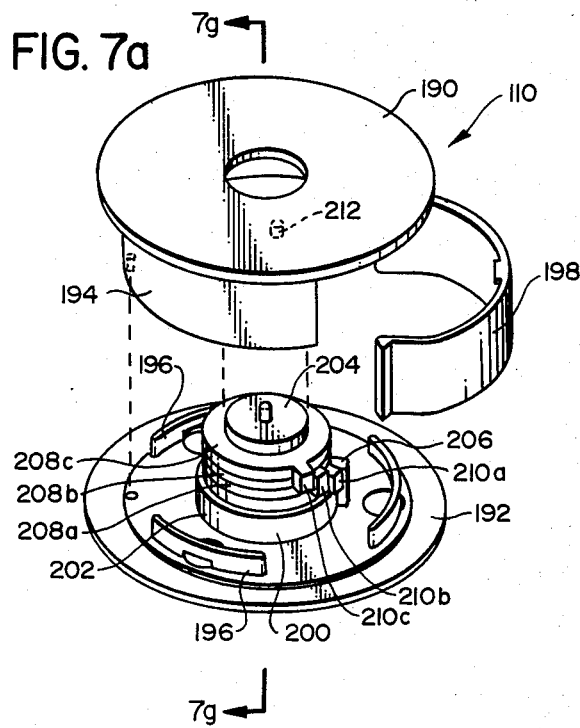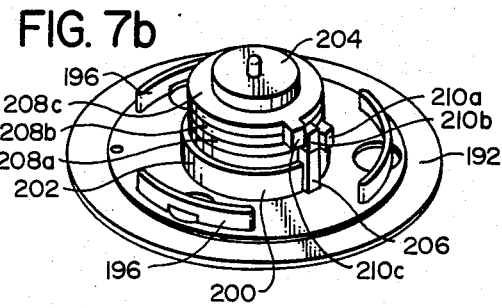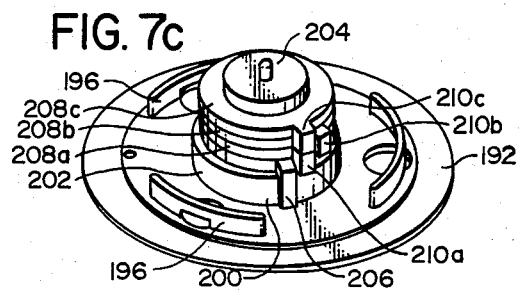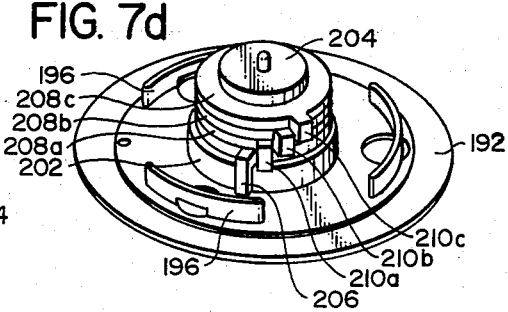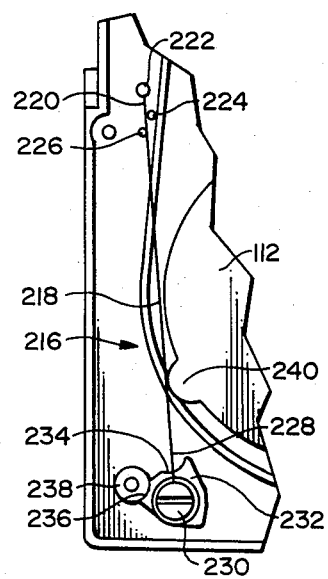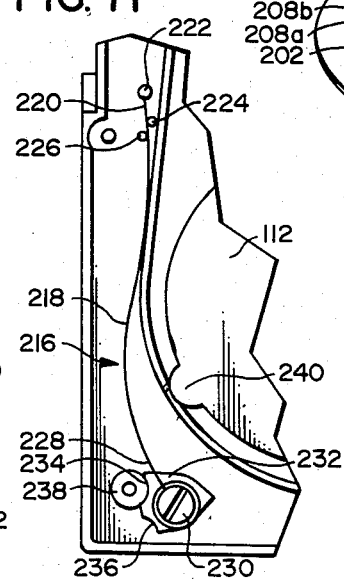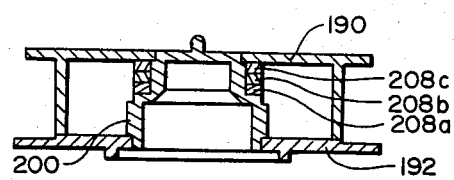

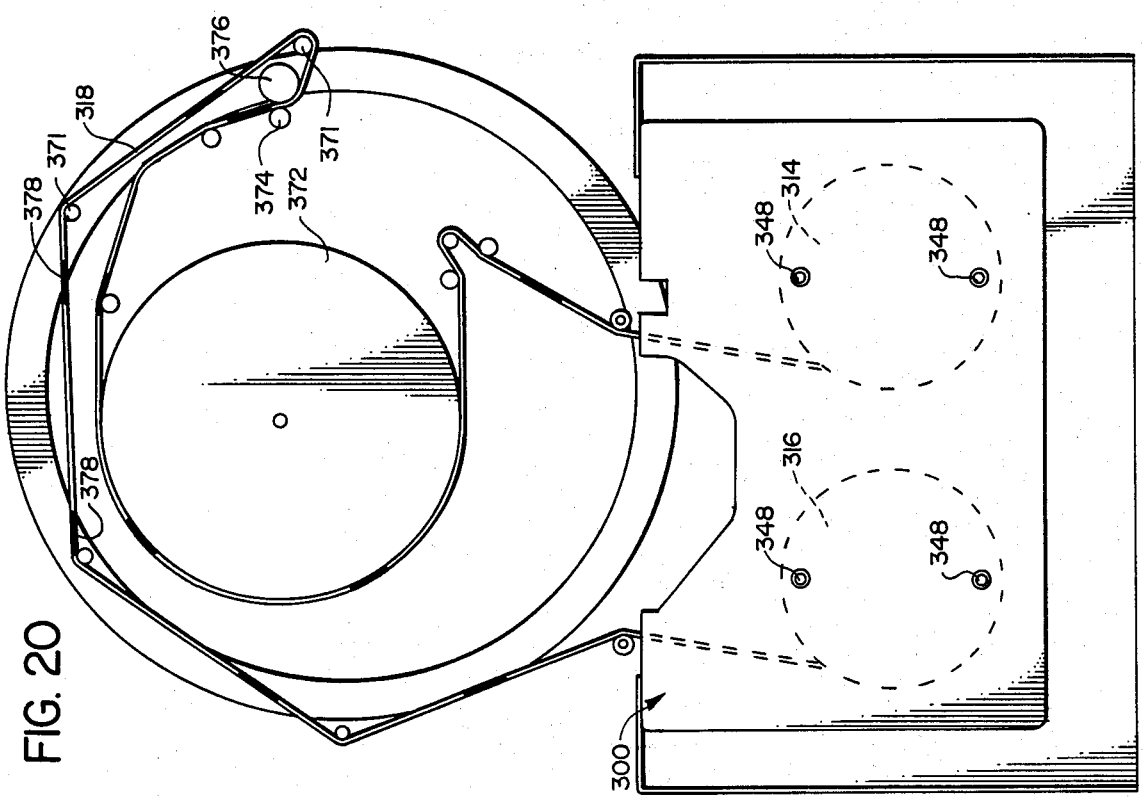
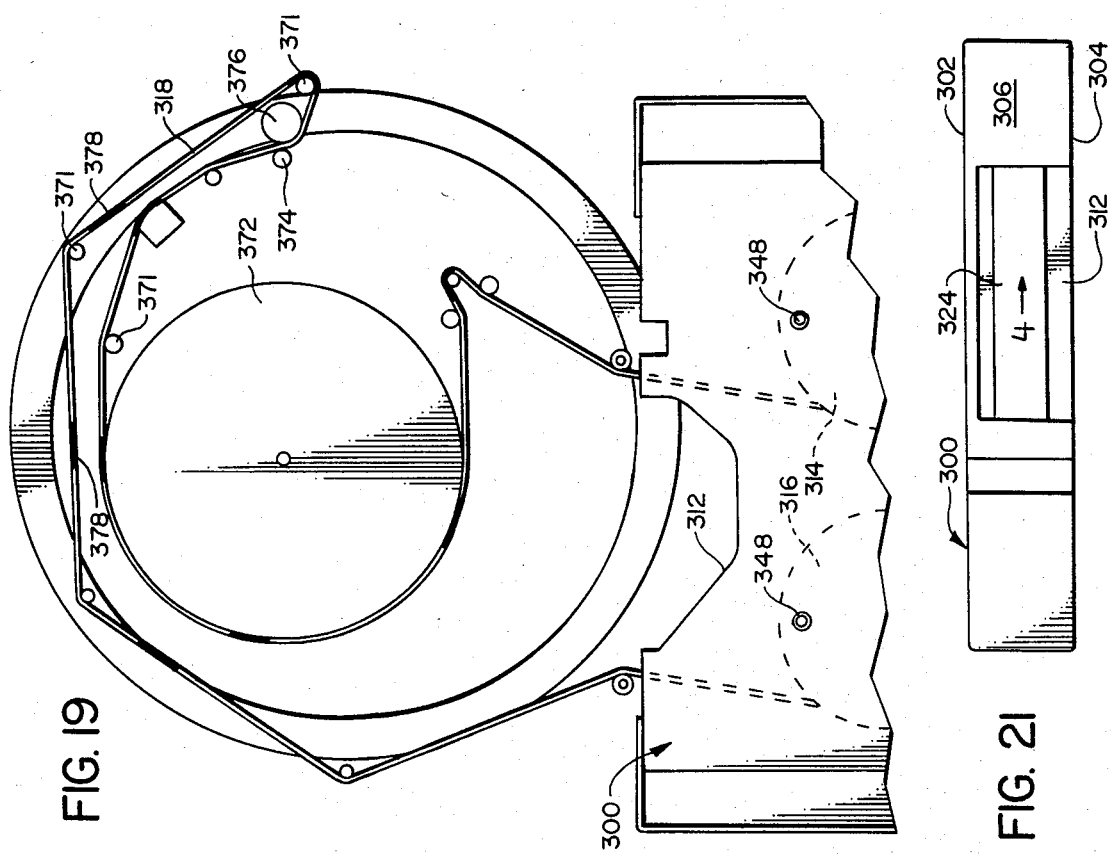

APPARATUS AND METHOD FOR CLEANING A VIDEO PLAYER/RECORDER

CROSS REFERENCE TO RELATED APPLICATIONS

This is a continuation-in-part of U.S. application Ser. No. 06/253,943, filed Apr. 14, 1981, now abandoned, which is a continuation-in-part of U.S. application Ser. No. 06/223,025, filed Jan. 6, 1981, entitled "Apparatus and Method for Cleaning a Video Player/Recorder", now issued as U.S. Pat. No. 4,387,411, which in turn is a continuation-in-part of U.S. application Ser. No. 06/109,650, filed Jan. 4, 1980, entitled "Video Player/Recorder Cleaning Apparatus and Method", now abandoned.

TECHNICAL FIELD

The present invention relates to a method and apparatus for cleaning operating components of a video player/recorder.

BACKGROUND ART

In video player/recorders typically there is a video head which either records or plays back the video portion of a playing tape, an audio head, an erase head, and possibly other components which engage the tape. For proper operation of the player/recorder, it is desirable that the surface portions of these components be cleaned periodically.

The prior art shows various cassette-like devices which have cleaning elements to engage the operating components of the units. Some of these use reciprocating or rotating cleaning members. Some move a ribbon past the audio head of an audio player recorder.

In some video player/recorder units, some of the operating components are placed so that the tape must be moved by the guide members a relatively large distance into the operating area of the unit to engage the operating components. Because these components are relatively inaccessible, they are particularly difficult to be cleaned effectively, and be cleaned so as not to damage the more delicate components.

Also, in some video player/recorder units which have the same arrangement of operating components, the drive mechanisms which rotate the spools of the cassette on which the tape is wound operate somewhat differently. Therefore, if the power mechanism of the unit is to be utilized in some manner to perform a cleaning function on the operating components of the unit, there are difficulties in arranging any cleaning apparatus to take account of these differences.

In view of this, it is an object of the present invention to provide a method and apparatus which can effectively and reliably clean operating components of a video player/recorder, particularly where the operating components are relatively inaccessible and susceptible to being damaged, and where the player/recorder has drive units of differing characteristics.

DISCLOSURE OF THE INVENTION

There is a cleaning device particularly adapted for use with a playing/recording apparatus where there is a head member which has a head surface that is subject to contamination and also guide means movable between a first retracted position and a second operating position to move a tape into operating engagement with the head member. The device of the present invention is adapted to clean at least the head surface, and comprises a housing adapted to be mounted in an operating position relative to the apparatus. A cleaning ribbon is mounted in said housing so as to have a retracted pre-cleaning position within said housing and a cleaning position where the ribbon is extended from the housing.

The housing has first opening means at a forward portion of the housing to expose a guide engaging first portion of the ribbon for engagement by the guide means to extend the ribbon from the housing to its cleaning position, in a manner that a cleaning second portion of the ribbon is moved into engagement with at least the head member.

The housing has second access opening means through which the second portion of the ribbon is exposed when the ribbon is in its retracted position, in a manner that a cleaning material can be applied to the second ribbon portion when the ribbon is in its retracted position.

Desirably, there is a rotatably mounted spool located in the housing and engaging the ribbon. The spool is arranged relative to the ribbons so as to be able to be rotated to a pre-cleaning spool position where the ribbon is wound on the spool in its pre-cleaning position. The device further comprises locating means to position the ribbon and the spool in their pre-cleaning positions.

In one form, the locating means comprises an indicating member operatively connected to the spool in a manner that rotation of the spool moves the indicating member to show position of the ribbon relative to the spool.

In another form, the locating means comprises indicia on the ribbon to indicate position of the ribbon relative to the pre-cleaning position of the ribbon.

In yet another form, the locating means comprises cooperating stop means which come into engagement when said spool has been rotated to its pre-cleaning position.

In one form, the access opening means comprises a plurality of spaced access openings located along an edge portion of said housing.

In another form, the spool is provided with a plurality of circumferentially spaced holes which expose the ribbon when wound on the spool. The access opening means comprises at least one housing opening positioned adjacent the spool openings, whereby a cleaning material can be inserted through the housing opening to be applied to at least a portion of said spool openings at said ribbon location on the spool.

In another form of the invention, there are two spools rotatably mounted in the housing, with the ribbon being adapted to be wound on each of said spools. Each spool has opening means to expose the ribbon. The housing has openings positioned adjacent the spool opening means, whereby a cleaning material can be applied to the housing opening and through the spool openings to cause the cleaning material to be applied to the ribbon portions adjacent the housing openings.

The device further comprises clutch means adapted to operatively engage one spool in a manner to rotate the spool in a first direction, and permit at least limited relative rotation of the spool in a second direction. In the preferred form, the clutch means comprises at least a first clutch member connected to the spool and a second clutch member adapted to engage the drive member of the apparatus. The two clutch members have first and second tooth means located for driving engagement, and also located for at least limited free relative rotation.

In the method of the present invention, the cleaning ribbon in the housing is moved to a pre-determined pre-cleaning location, and a cleaning material is applied through the opening means in the housing against the ribbon at spaced locations thereon. Then the device is inserted in the playing/recording apparatus, and the apparatus operated to cause the guide means of the apparatus to move the ribbon outwardly to the cleaning position, where the cleaning portions of the ribbon having the cleaning material thereon come into engagement with at least the head member of the apparatus.

Other features of the invention will become apparent from the following detailed description.

BRIEF DESCRIPTION OF THE DRAWINGS

FIG. 7a is an exploded view of the take-up spool of the device of the present invention, and illustrating the drive clutch assembly in a first limit position;

FIG. 7b is a view similar to FIG. 7a showing the bottom portion of the spool, where the clutch mechanism has been moved to a first intermediate position due to a first increment of counterclockwise rotation of the hub of the spool;

FIG. 7c is a view similar to FIG. 7b showing a second intermediate clutch position where the hub of the spool has been rotated counterclockwise a second time;

FIG. 7d is a view similar to FIGS. 7b and 7c but showing the clutch mechanism in a second limit position;

FIG. 7e is an enlarged view looking downwardly toward the device of the present invention and illustrating an operating knob thereof in a first operating position;

FIG. 7f is a view similar to FIG. (e) showing the knob in a second operating position;

FIG. 7g is a sectional view taken along line 7g—7g of FIG. 7a;

FIG. 19 is a view similar to FIGS. 10 and 14, showing the cleaning ribbon of the unit in its fully extended cleaning position;

FIG. 20 is a view similar to FIG. 19, showing the cleaning ribbon having been moved through the apparatus in its cleaning cycle;

FIG. 21 is a front view of the cleaning ribbon in its retracted position, and showing indicia on the ribbon for locating the ribbon in its pre-cleaning position.

BEST MODE FOR CARRYING OUT THE INVENTION

The first embodiment of the present invention is particularly adapted to cleaning the operating components of a video recording/playing unit which is adapted to accept cassette-type playing tapes, and which has the operating components that engage the tape at relatively inaccessible locations in the operating area of the unit. Such a unit is one which is currently marketed under the trademark BETAMAX, manufactured by the Sony Company of Japan. Accordingly, it is believed that a clearer understanding of the present invention will be obtained by first describing the operating components of the BETAMAX video playing/recording unit.

Figure 1:
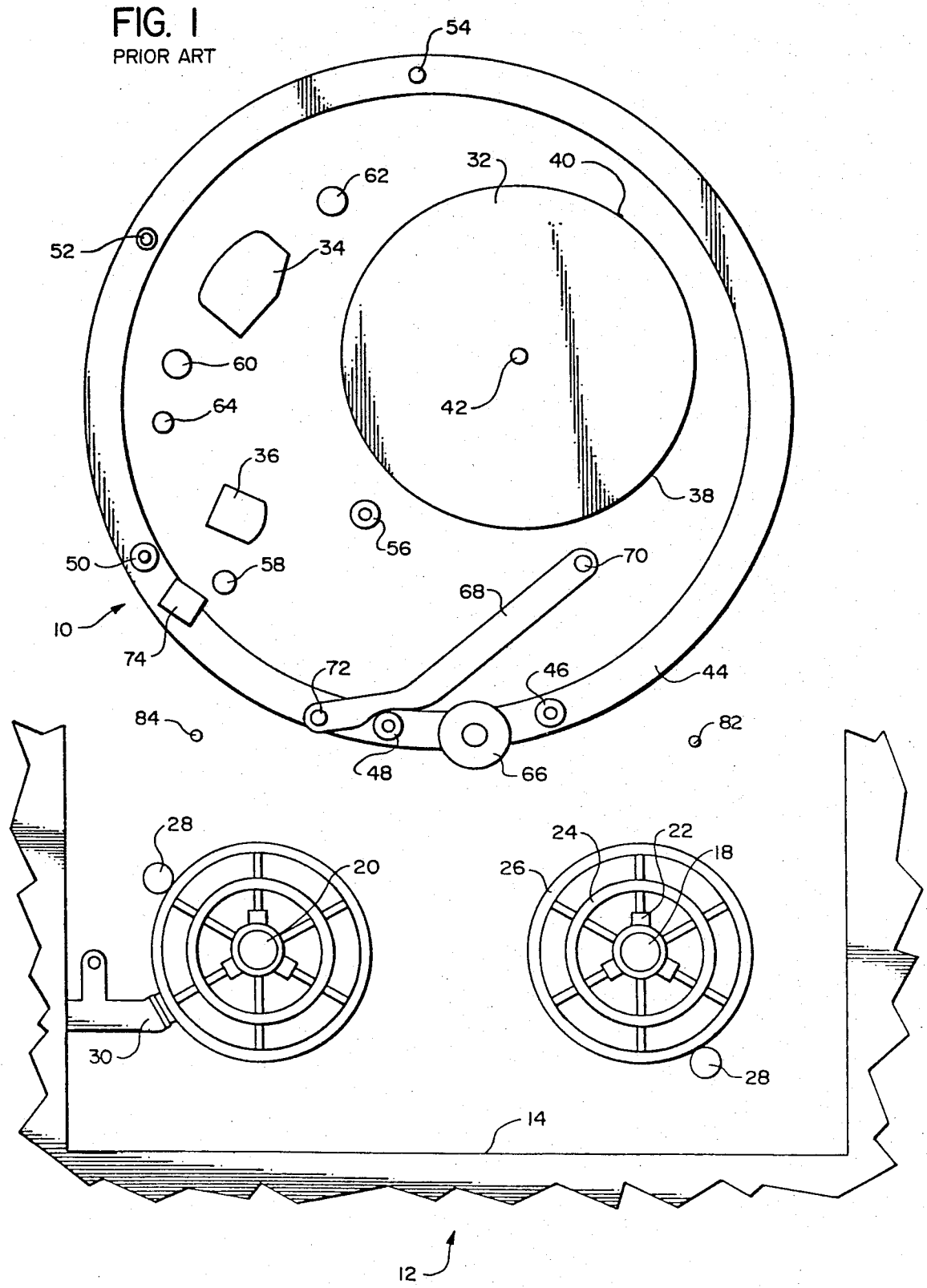
FIG. 1 is a semi-schematic plan view looking down on the main operating components of a video player/recorder for which the present invention is particularly adapted.

In the following description, the video playing/recording unit 10 will be reffered to as "the video unit" or simply as "the unit". With reference to FIG. 1, the term "forward" and "rear" will denote proximity to those portions of the unit 10 shown at, respectively, the upper and lower parts of FIG. 1. In like manner, the terms "right" and "left" will denote proximity to the portions of the unit 10 shown at the right and left parts of the drawing of FIG. 1.

Before proceeding further, it should be emphasized that the components shown in FIGS. 1 through 4 (which will now be described) already exist in the prior art, and the present invention is adapted to be used in cooperation with such prior art apparatus.

Figure 2:
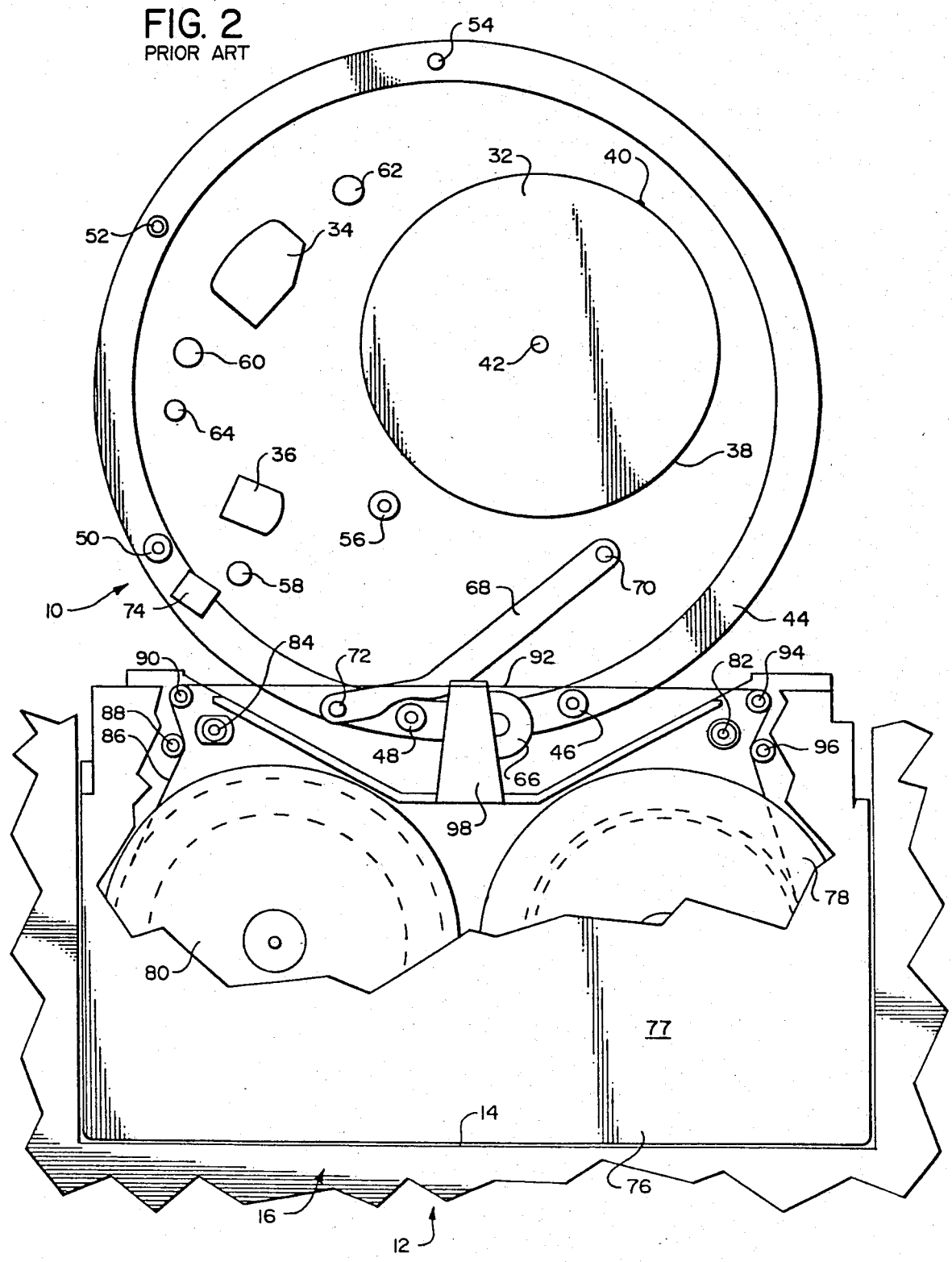
FIG. 2 is a view similar to FIG. 1, showing a tape cassette being installed in the unit shown in FIG. 1.
Figure 3:
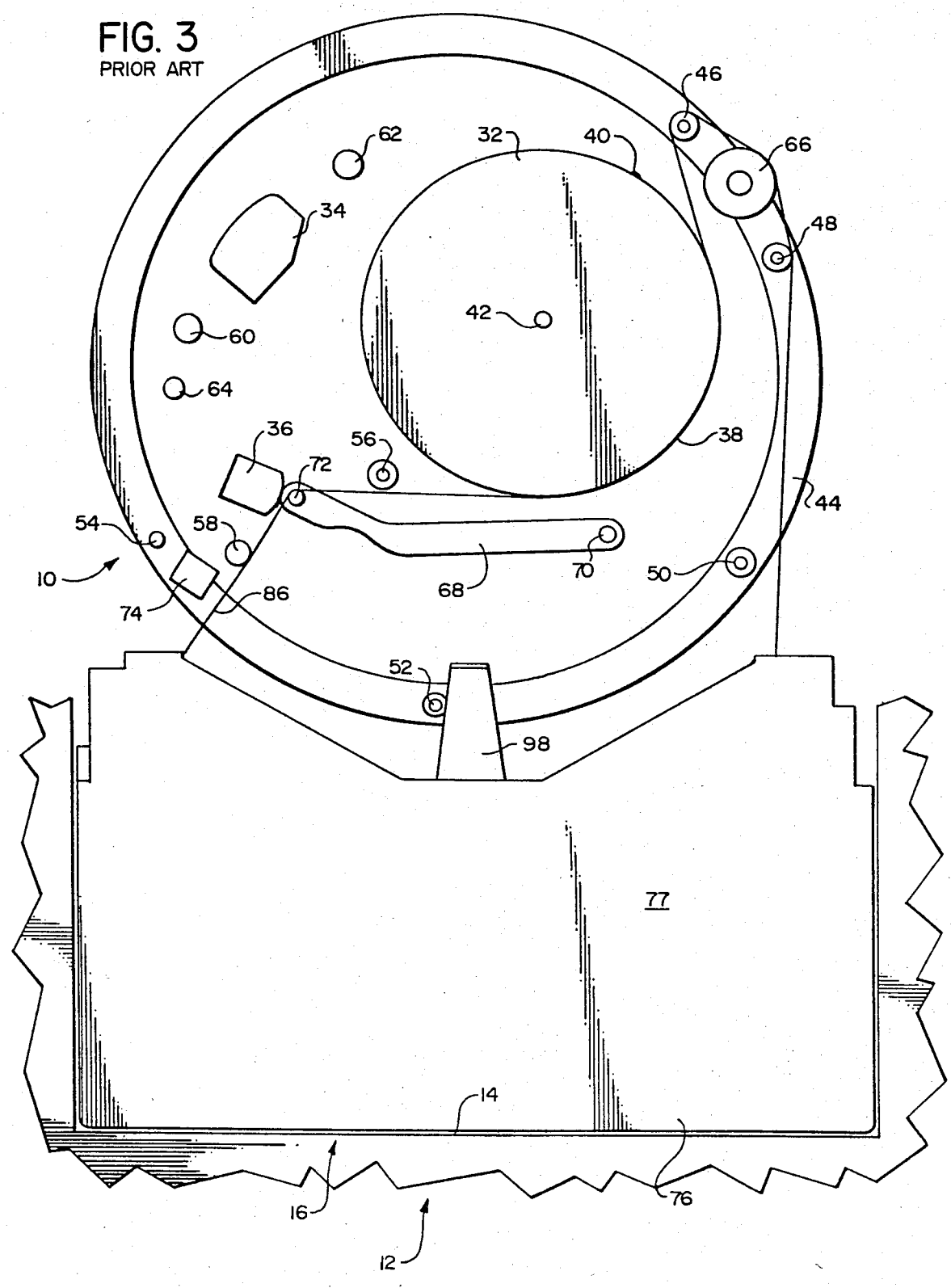
FIG. 3 is a view similar to FIG. 2, showing the guide members of the unit moving the tape outwardly from the cassette toward the full operating position.
Figure 4:
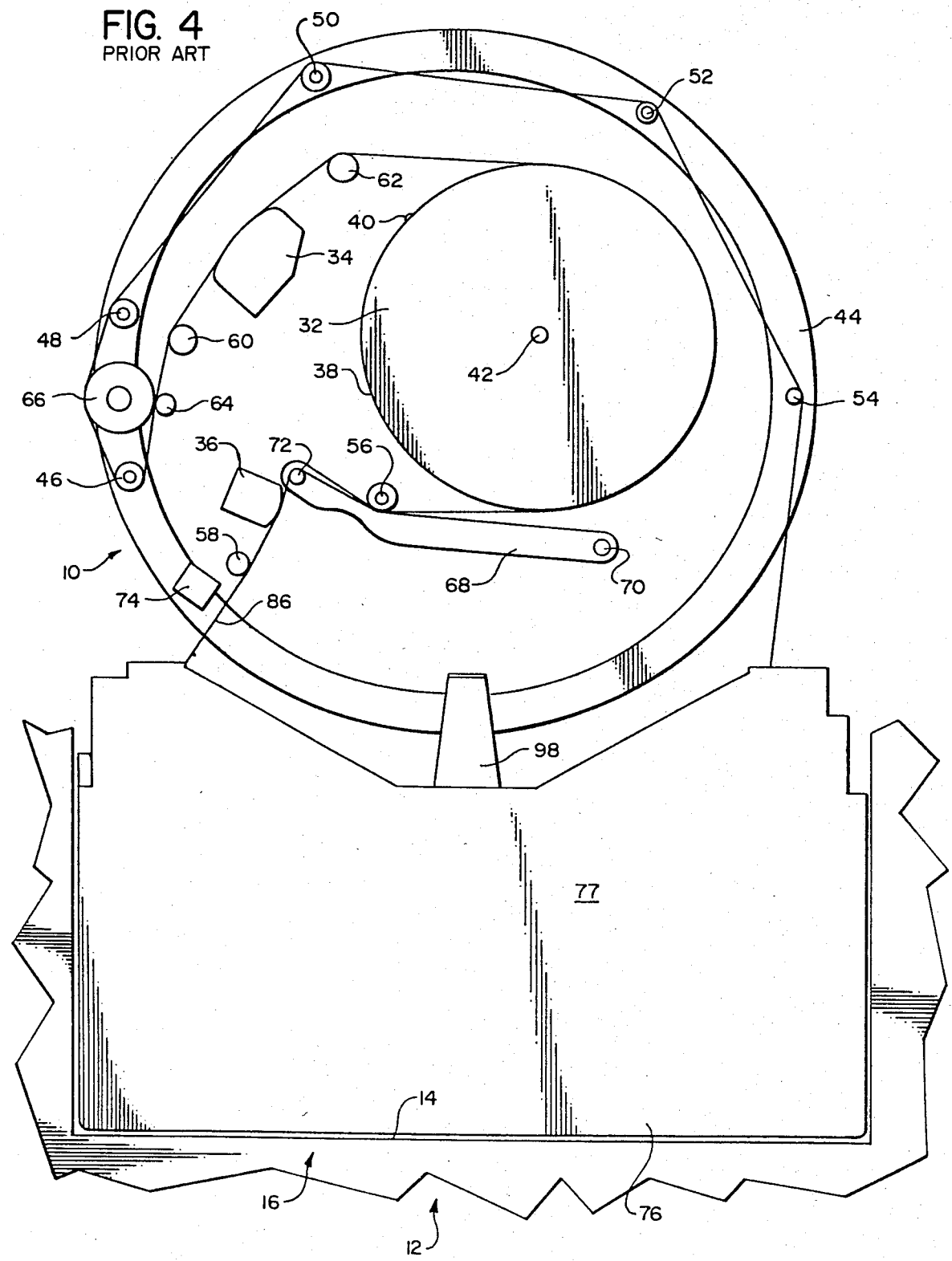
FIG. 4 is a view similar to FIG. 3, showing the guide members having moved the tape to its operating position.

The unit 10 has a main housing 12, which provides a recess 14 to receive a tape cassette 16 (shown in FIGS. 2 through 4). With further reference to FIG. 1, there is a first right take-up spindle 18 and a second left rewind spindle 20 located within the recess 14. Each of the spindles 18 and 20 have a plurality of sprocket teeth 22 to engage a related spool of a tape cassette, and an intermediate ring 24 to support a related spool. Also secured to each spindle 18 and 20 is a related drive ring 26 which is adapted to engage a related drive roller 28. At the left spindle 20, there is also a brake member 30 which is adapted to engage the left drive ring 26 and stop rotation of the left spindle 20.

Located forwardly of the recess 14 is an operating area where there are three magnetic operating components which either respond to the magnetic signals on a tape, affect the magnetic signals on a tape, or do both. These magnetic operating components are: a video head 32, an audio head 34 and an erase head 36. The video head 32 can operate either as a playback head or a recording head. The video head 32 has the general configuration of a circular disc (i.e. a shallow cylinder), and has a peripheral cylindrically shaped operating surface 38. On the peripheral surface 38 there are one or more scanning elements 40, and the head 32 rotates about the center axis 42 of the cylindrical surface 38.

The audio head 34 operates on the audio portion of a tape to either play back audio signals on the tape (in the playing mode) or to record audio signals on the tape when the unit 10 is in its recording mode. The erase head 36, as its name implies, is operated to cause erasure of the magnetic signals on the tape.

Positioned circumferentially around the heads 32, 34 and 36 is a relatively large circular guide ring 44. At selected locations on the guide ring 44, there are five guide elements, numbered 46, 48, 50, 52 and 54, respectively. In operation, this guide ring 44 rotates about its center axis so that the various guide elements 46 through 54 engage the tape to move it outwardly into engagement with the heads 32 through 35.

In addition to the movable guide elements 46 through 54, there are four stationary guide elements, designated 56, 58, 60 and 62 respectively. A capstan 64 is positioned at a fixed location at the left side of the operating area, and a pinch roller 66 is mounted to the rear part of the ring 44 so as to be movable with the ring 44. As will be disclosed later herein, the ring 44 rotates the pinch roller 66 to a position where it can come into engagement with the capstan 64 so as to be able to move the playing or recording tape through the unit 10.

There is a locating arm 68 pivotally mounted at 70 to the stationary structure. At the outer or swing end of the arm 68, there is a movable guide member 72. Finally, there is a stop mechanism which comprises a sensing element 74. This sensing element 74 is stationary and is positioned a moderate distance above the ring 44, so that the ring 44 is able to rotate without the guide elements 50, 52, and 54 coming into contact with the sensing element 74.

To describe the usual operation of the prior art unit 10 described above, reference is now made to FIGS. 2 through 4. In FIG. 2, it can be seen that a tape cassette 16 has been placed in the recess 14. This cassette 16 comprises a housing 76, the top cover 77 of which is broken away to show the main components of the cassette 16. There is a right take-up spool 78 that mates with the right spindle 18 and a left rewind spool 80 that mates with the left spindle 20. The housing 76 is provided with right and left locating holes to receive, respectively, right and left locating pins 82 and 84.

The cassette housing 76 carries a playing/recording tape 86 which is wound on the two spools 78 and 80. This tape 86 extends from the left side of the left spool around two left forward guide members 88 and 90 in the housing 76, and thence across the forward part of the cassette housing at 92. The tape 86 on the right side of the housing 76 engages two right forward guide members 94 and 96 to wind onto the right side of the right spool 78. At the middle forward part of the housing 76, there is a stationary locating finger 98 that properly positions the forward tape portion 92 at the front of the housing 76. The finger 98 is positioned moderately above the top edge of the front tape portion 92 and has a downwardly extending member (not visible in FIGS. 2 through 4) which actually engages the back side of the front tape portion 92.

The guide ring 44 is mounted in the unit 10 in a manner that it is slanted downwardly to the left, as seen in FIGS. 1 through 4. Thus, the left part of the ring 44 is at a lower location, the forward and rear portions of the ring 44 are at intermediate elevations, and the right portion of the ring 44 is at the highest location. Also, the center of rotation of the ring 44 is slanted so as to be perpendicular to the plane occupied by the ring 44. When the unit 10 is in its pre-operating position, the various components are in the position shown in FIG. 1. When the cassette 16 is placed in the recess 14, the forward tape portion 92 is positioned immediately forwardly of the two guide elements 46 and 44, the pinch-roller 66 and the guide member 72.

There are at least three types of video player/recorder units having generally the same physical arrangement as the unit shown in FIGS. 1 through 4. The operation of a first one of such units will first be described immediately below. Thereafter, the operations of the second and third types of units will be described.

To describe the operation of the first type, as soon as the cassette 16 is placed into the recess 14, a mechanism in the unit 10 is automatically triggered to cause the guide ring 44 to rotate in a counterclockwise direction. At the same time, the locating arm 68 is caused to swing forwardly, and the brake 30 engages the drive ring 26 of the left spindle 20 to prevent rotation of the left spindle 20.

As the ring 44 begins to rotate, the lead guide member 46 engages the rear surface of the forward tape portion 92 to pull the tape 86 outwardly. Since the brake 30 holds the spindle 20 stationary, the tape 86 is unwound from the right spool 78 which in this mode is able to rotate freely in a counterclockwise direction.

In FIG. 3, it can be seen that the ring 44 has rotated moderately more than 90 degrees, so that the tape 86 engages part of the circumferential surface 38 of the video head 32. The ring 44 continues to rotate from the position of FIG. 3 until it reaches its fully extended position, shown in FIG. 4. It can be seen that the ring 44 has rotated nearly three-quarters of a full revolution (i.e. approximately 270 degrees) to reach the position of FIG. 4. As indicated above, the unit 10 is so arranged that it automatically brings the tape 86 to the position of FIG. 4 when the cassette 16 is placed in the recess 14. When it is desired to operate the unit 10, either the play or record button is pressed, and this causes the pinch roller 66 to move a short distance to the right to press the tape 86 against the capstan 58. At the same time the head 42 begins to rotate and very quickly reaches a high rate of rotational speed. When the pinch roller 66 engages the capstan 64 the brake 30 releases so as to permit the left spool 80 to rotate. The capstan 64 rotates in a counterclockwise direction to cause the tape 86 to travel along its length in a direction to unwind from the spool 80 and to be wound onto the right spool 78.

At the same time, the right spindle 18 rotates clockwise to rotate the take-up spool 78 to have the tape 86 wound thereon and thus take up the slack in the tape 86.

The video head 32 rotates at a relatively high rate of speed (e.g. 1,000 to 2,000 revolutions per minute) so that the element or elements 40 on the head 32 are able to scan the tape 86 as it passes by.

Near the end of the tape which is wound on the left spool 80, there is a piece of metal foil to which the sensing shut-off element 74 is responsive. As this piece of foil on the tape 86 passes by the element 74, this element 74 reacts to cause the drive system of the unit 10 to be deactivated in a manner that the pinch roller 66 moves away from the capstan 64, the take-up spool 78 stops rotating, and the tape 86 remains stationary. To rewind the tape, the rewind button on the unit 10 is pressed so that the left spindle 20 begins to rotate in a counterclockwise direction to rotate the rewind spool 80 in a counterclockwise direction at a relatively high rate of speed and rewind the tape 86 onto the left spool 80. The right end of the tape 86 is fixedly attached to the right spool 78, so that when the tape 86 is totally unwound from the spool 78, it resists further rotation of the rewind spool 80 to trigger a mechanism in the unit 10 to cause the rewind spool 80 to stop rotating. Alternatively, a second shut off mechanism, such as that at 74, can be provided.

Then when an eject button is pushed, the ring 44 rotates clockwise back to the position of FIG. 2, and the locating arm 68 retracts to the position of FIG. 2. At the same time, the take-up spool 78 rotates clockwise to wind the remaining portion of the tape 86 onto the right spool 78. With the tape 86 in this position, the cassette 16 is ready for a second playing or recording, in the same manner as indicated above.

There is a second type of video playing/recording unit which has substantially the same operating components as shown in FIGS. 1 through 4. The operation of the second unit differs from the first unit described above, in that with the second unit, when the tape cassette is inserted into the recess 14, the playing head 32 begins to rotate immediately. Thus, as the guide ring 44 engages the tape 92 to carry it outwardly into its playing position, the head 32 is already rotating. Another characteristic of this second type of unit is that as the ring 44 rotates to carry the tape 92 into its playing position, the braking action on the left spool 80 is either non-existent or exerts a minimal braking force on the left spool 80. In other respects, the operation of the second type of unit, insofar as it is directly relevant to the present invention, is substantially the same as the first type of unit.

The third type of unit also has substantially the same arrangement of physical components as shown in FIGS. 1 through 4. However, when the tape cassette is initially placed in the machine and the ring 44 rotates to pull the tape 86 outwardly to the playing position, the right spindle that engages the take-up reel remains stationery, while the left spindle that engages the supply spool is permitted to rotate. Thus, the tape 86 is pulled out to the playing position in a manner to unwind the tape 86 from the left supply spindle 80. When the retract button is pushed, so that the ring 44 rotates back to the retracted location, the excess tape is moved from the playing position to be wound onto the right take-up reel.

One of the problems with all such units is the build up of oxides or other foreign particles on the operating components, particularly the video and audio heads 32 and 34. Such contamination can result from, for example, particles of tape being deposited on the playing surface. (This can occur especially when there is frequent "stop frame usage" where a frame is held stationary against the rapidly rotating video head 32). Also, dust and other pollutants in the air can cause an accumulation on the operating surfaces of the two heads 32 and 34. It is also desirable that the capstan 64 and pinch roller 66 be cleaned periodically.

As indicated earlier, all of the components which have been described thus far with reference to FIGS. 1 through 4 already exist in the prior art. The present invention is particularly adapted to perform an effective cleaning operation on certain operating components of the unit 10, and this will now be described with reference to FIGS. 5 through 11.

Figure 5:
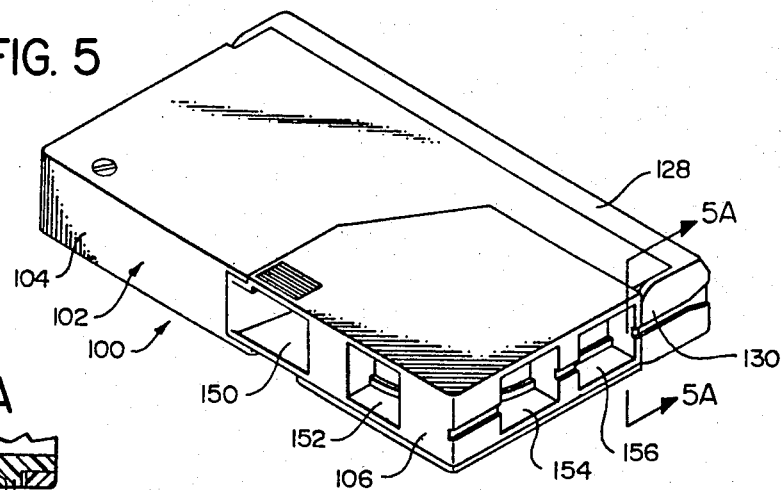
FIG. 5 is an isometric view looking downwardly toward the right rear corner of the cleaning device of the present invention.

The apparatus of the present invention is provided in the form of a cassette-type cleaner, indicated at 100, and shown in isometric view in FIG. 5. It can be seen that the cleaner 100 comprises a housing structure 102, having the same overall configuration as the housing 76 of the prior art tape cassette 16 previously described. Thus, the housing structure 102 can readily be inserted into the recess 14 of the unit 10.

The housing structure 102 is made up of a main structure 104 and a cartridge 106 which is removably mounted to the main structure 104. The other main components of the cassette cleaner 100 are a cleaning ribbon 108, a right take-up spool 110, a left locating spool 112, and a limiting linkage 114. The main reason for the removable cartridge 106 is to provide for the easy replacement of the cleaning ribbon 108, and this will be described more fully hereinafter.

Figure 8:
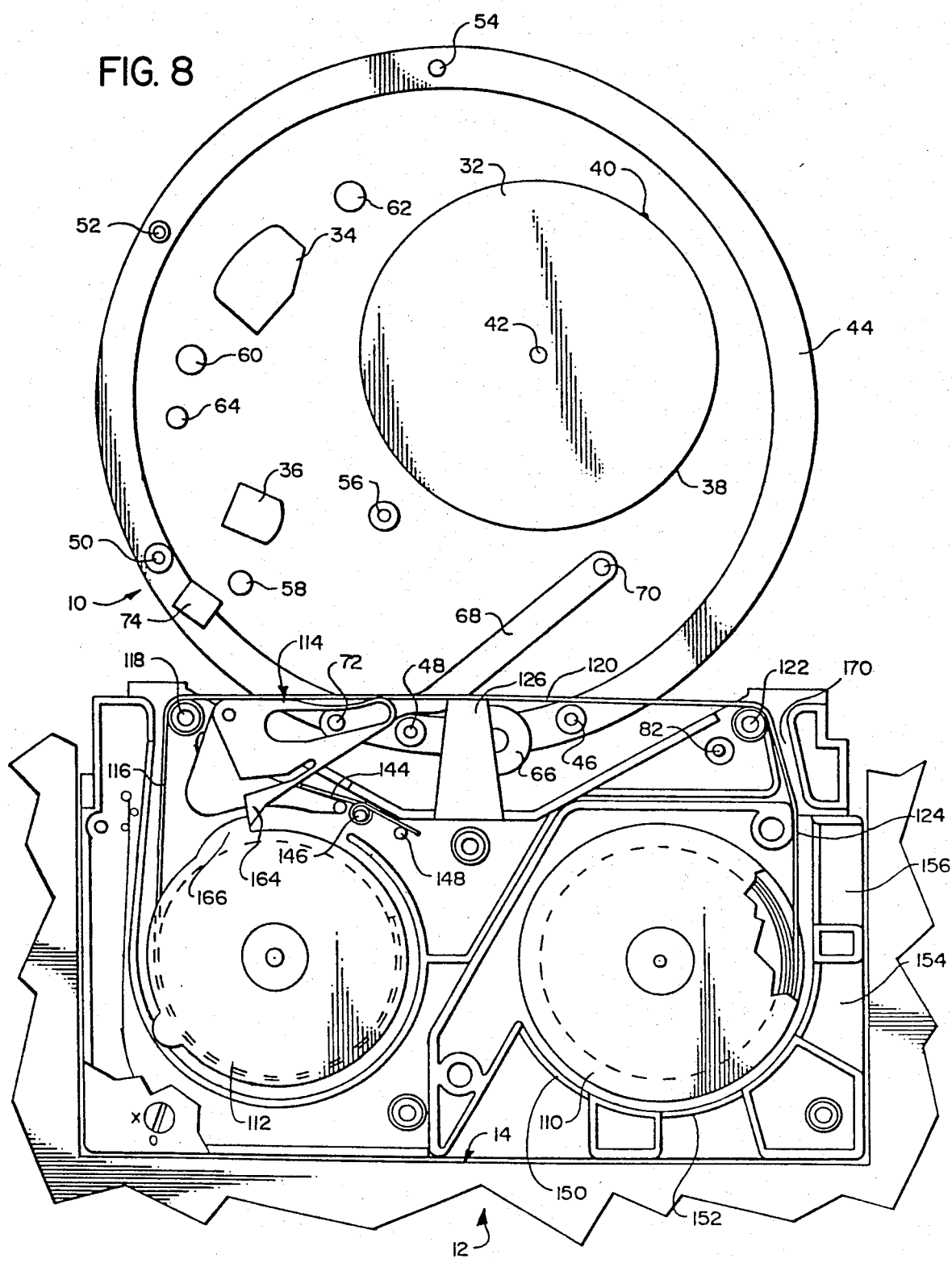
FIG. 8 is a view similar to FIG. 2, but showing the device of the present invention installed in the video player/recorder unit of FIG. 1, and with the top cover removed for purposes of illustration.

To further describe the cassette cleaner 100, reference is now made to FIG. 8, where the cassette cleaner 100 is shown just having been placed in the recess 14 of the unit 10, so that there has been no rotation of the ring 44 nor extension of the locating arm 68. The right spool 110 is mounted in the cartridge 106 and is adapted to receive the right spindle 18. The spool 110 has a relatively large diameter, and in the position of FIG. 8, the cleaning ribbon 108 is wound approximately three times around the circumference of the spool 110. The left locating spool 112 also has a relatively large diameter, and the cleaning ribbon 108 is wound approximately more than halfway around the left spool 112. The cleaning ribbon 108 extends from the left side of the spool 112 forwardly as at 116 to a left forward guide roller 118, thence at 120 across the forward portion of the housing structure 102 to a right front guide roller 122, thence rearwardly at 124 to the right side of the spool 110 to be wound thereon. At the middle forward portion of the housing structure 102, there is a locating finger 126 which is quite similar in structure and function to the finger 98 of the conventional tape cassette housing 76. There is a protecting lid 128 that extends across the entire forward part of the housing structure 102. This lid 128 is pivotally mounted at end locations 130 and 132 to the right and left forward portions of the housing structure 102. This lid 128 is shown in its closed position in FIG. 5, where it covers the forward ribbon portion 120, and in its raised open position in FIG. 6.

Figure 6:
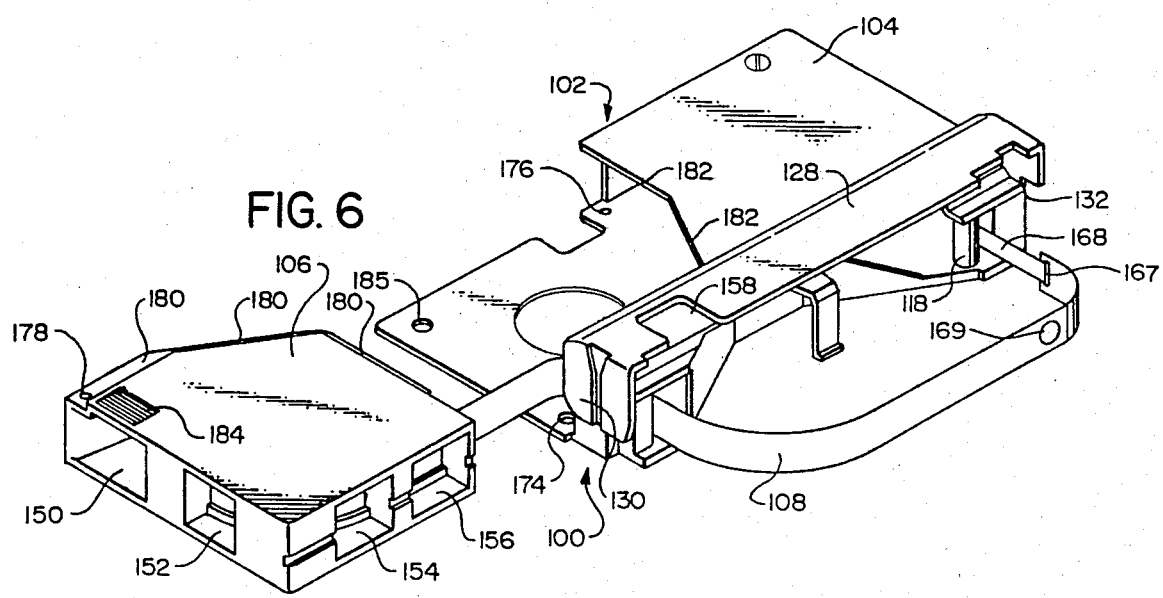
FIG. 6 is an isometric view looking downwardly on the right front corner of the device of the present invention, and showing the cartridge portion of the present invention removed from the main cassette housing.
Figure 9:
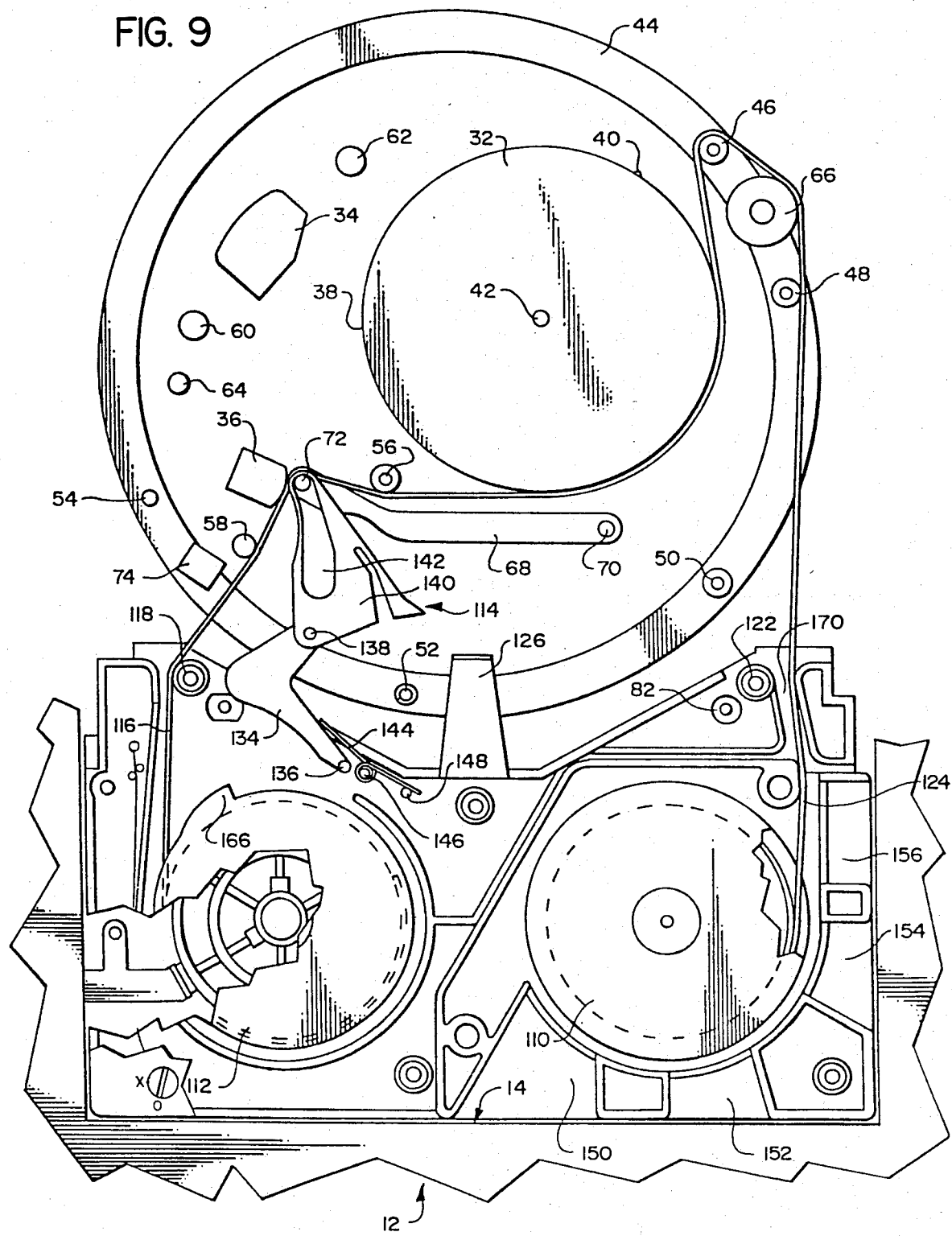
FIG. 9 is a view similar to FIG. 8, showing the guide members of the unit moving the cleaning ribbon of the present invention outwardly into cleaning engagement with the components of the unit.
Figure 10:
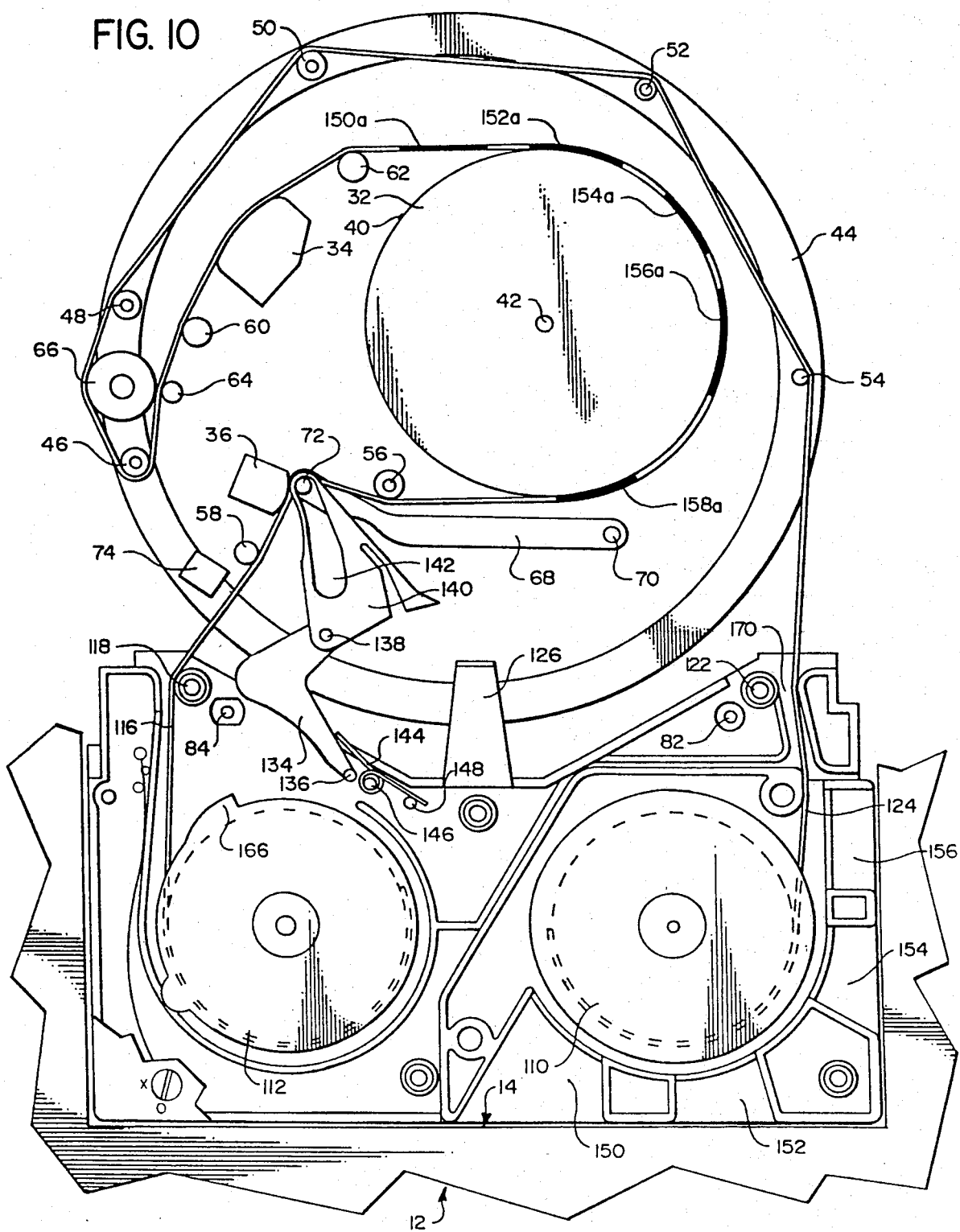
FIG. 10 is a view similar to FIG. 9, showing the cleaning ribbon having been moved to its full cleaning position.

The previously mentioned limiting linkage 114 can best be seen in FIGS. 9 and 10, but is not shown in FIG. 6 for ease of illustration. This linkage 114 comprises a first link 134 pivotally mounted at 136 to the main housing structure 104. The outer end of the link 134 has a second pivot connection 138 to a second link 140. The second link 140 has an elongate through-slot 142 which receives the upstanding guide member 72 that is positioned at the swing end of the locating arm 68 of the unit 10. The reason for the lengthened configuration of the slot 142 is that in different units 10, the locating arm 68 has different locations, so that the retracted position of the guide member 72 (which position is shown in FIG. 8) varies from unit to unit. Accordingly, the slot 142 is arranged to accomodate the varying locations of the movable guide member 72.

The limiting linkage 114 has a retracted position, shown in FIG. 8, and there is provided a spring member 144 which presses against the first link 134 to move it toward the retracted position. Specifically, this spring member 144 has a middle coiled portion mounted to a pin 146, with two outwardly extending arms, one of which engages a second pin 148, and the other of which presses the link 134 rearwardly.

The housing structure 102 is provided with a plurality of access openings, which are called wetting windows, and in the present embodiment there are five windows 150, 152, 154, 156 and 158. The reason for these windows 150 through 158 is that the cleaning ribbon is made of an absorbant material suitable for cleaning, such as a synthetic chamois material. It is important to apply a cleaning solution (generally a liquid cleaning solution) to those parts of the cleaning ribbon 108 that come into engagement with the components of the unit 10 which are to be cleaned. However, it is not desirable to apply an excess amount of cleaning solution to the ribbon 108. Thus, the wetting windows 150 through 158 are provided to not only give access to wet the ribbon 108, but also to indicate the optimum location of the wetted portions of the ribbon 108.

In the particular configuration shown herein, four of the windows 150 through 156 are provided at the periphery of the cartridge 106. Specifically, the two windows 150 and 152 are at the rear part of the cartridge 106, and the two windows 154 and 156 are at the right side portion of the cartridge 106. The fifth window 158 is formed in the forward right portion of the lid 128. Thus, all five windows 150 through 158 are formed in the right side of the housing structure 102. It is to be understood that the number, size and location of these windows 150 through 158 can be varied to accommodate other video units.

Figure 7:
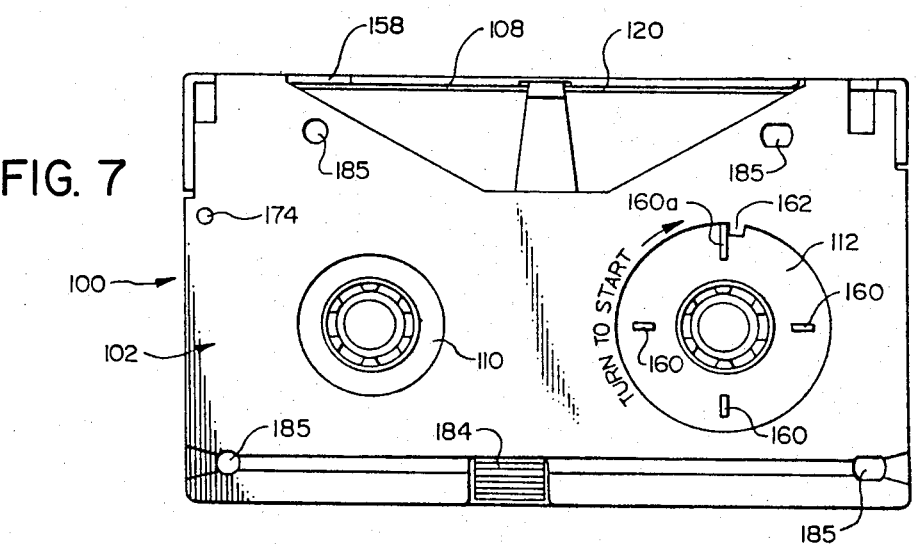
FIG. 7 is a plan view looking at the bottom surface of the device shown in FIG. 5.

Reference is now made to FIG. 7 which shows the bottom surface of the cassette cleaner 100. It will be noted that the locating spool 112 has four tabs 160 extending downwardly from the bottom side of the spool 112. One of these tabs, designated 160a, protrudes outwardly radially further than the other three tabs 160, so that the tab 160a is able to engage a stop member 162. The purpose of this stop member 162 is to enable the spool 112 to be turned to a predetermined starting location prior to when the cassette cleaner 100 is mounted in the recess 14 to perform its cleaning operation.

With reference to FIG. 8, it will be noted that there is a stop member 164 mounted to the outer end of the first link 134 of the limiting linkage 114. This stop member 164, in the position of FIG. 8, engages a matching stop member 166 to prevent clockwise rotation of the spool 112. However, when the limiting linkage 114 extends, as in FIG. 9, the stop member 164 becomes disengaged to permit clockwise rotation of the spool 112.

A foil piece 169 is fixedly secured to the ribbon 108 at a location spaced a short distance from the end portion of the ribbon that is adjacent to the spool 112. This foil piece 169 is provided to activate the sensing element 74 of the shut-off mechanism to stop further travel of the ribbon 108 at the completion of the cleaning cycle.

As indicated earlier, the housing structure 102 is made up of a main structure 104 and a removable cartridge 106. These components can be seen more clearly in FIG. 6, where the cartridge 106 is shown removed from the main structure 104.

As indicated previously, the cleaning ribbon 108 remains permanently attached to the right spool 110 in the cartridge 106. The opposite end of the ribbon 108 is provided with an attaching slot 167 that can be attached to an attaching strip 168 that is permanently attached to the left spool 112. To mount the cartridge 106 to the structure 104, first the ribbon 108 is unwound from the right spool 110 in the cartridge 106, passed through the right front through opening 170 in the housing structure 104, and then attached to the strip 168, as indicated in FIG. 6.

Figure 5A:
FIG. 5A is a sectional view taken at line 5A—5A of FIG. 5.

To mount the cartridge 106 into the structure 104, there is provided a small pin 172 protruding downwardly from the lower right front wall portion of the cartridge 106 (see FIG. 5a), and this fits into a matching hole 174 in the right front portion of the lower wall of the structure 104. Then the cartridge 106 is swung clockwise, as seen in FIG. 6, into the position shown in FIG. 5. The middle rear portion of the structure 104 is provided with upper and lower recesses (the lower one being shown at 176 in FIG. 6), and these match with upper and lower protrusions or dimples 178 to hold the cartridge 106 in place. The front and left upper edge portions 180 of the cartridge 106 are recessed slightly to fit under the matching edge portions 182 of the structure 104 so as to hold the cartridge 106 securely in position.

To remove the cartridge 106 from the structure 104, there are upper and lower thumb grips 184 which are adjacent the dimples 178 on the cartridge 106. These are squeezed toward one another to disengage the dimples 178 from the recesses 176. Then the cartridge 106 can be swung away from the structure 104 and removed to the position of FIG. 6. The ribbon 108 is then detached from the strip 168, and another cartridge can be put into place. As indicated previously, this replacement cartridge would be used when the ribbon 108 on the other cartridge has become dirty or worn to the extent that it loses its capability of cleaning properly.

The right take-up spool 110 is illustrated in more detail in FIGS. 7a through 7d. This reel 10 comprises a top and lower half 190 and 192, respectively, with each half 190 and 192 having a circular disc-like configuration. The top half 190 is formed with a partial cylindrical sidewall 194 on its lower surface, and this wall 194 fits around locating ribs 196 that are connected to the lower half 192. A suitable closure cover 198, having the same circular configuration as the sidewall 194 is removably attached to the two halves 190 and 192. When the two halves 190 and 192 are joined one to another, the cylindrical sidewall 194 fits over and outside of the locating ribs 196 to form a unitary spool 110. The closure cover 198 fits between the upper and lower halves 190 and 192 to form with the cylindrical sidewall 194 a complete 360° cylindrical surface.

A hub member 200 is rotatably mounted in the center of the lower half 192 of the spool 110. The hub 200 has a circular base portion 202 having interior recesses to mate with the sprocket teeth 22 of the unit 10. Fixedly attached to and upstanding from the base portion 202 is a post 204 that extends upwardly to fit in an opening in the top half 190. The base portion 202 has at its circumference a first clutch tooth 206.

There are three clutch rings 208 rotatably mounted on the post 204 in a manner that the rings 208 are stacked one on top of the other. Each clutch ring 208 has at its circumference a single clutch tooth 210 that protrudes moderately below the lower surface of its related ring 208. For convenience of description, the lowermost ring 208 and its tooth 210 are designated 208a and 210a; the intermediate ring and its tooth are designated 208b and 210b; and the uppermost ring and its tooth are designated 208c and 210c. With the rings 208 being stacked as shown in FIGS. 7a through 7d, the tooth 210a is able to engage the tooth 206; the tooth 210b is able to engage the tooth 210a; and the tooth 210c is able to engage the tooth 210b. It thus becomes apparent that each of the rings 208a-c can make nearly a full revolution from one position engaging the tooth immediately below to a position engaging that same tooth on the opposite side thereof.

Extending downwardly from the lower surface of the top half 190 of the spool 110 is a fifth clutch tooth 212 which is located so as to be able to come into engagement with the uppermost tooth 210c. The tooth 206 on the hub 200, the tooth 212, and the three rings 208a-c with their teeth 210a-c collectively form a drive clutch generally designated 214, characterized in that it will permit limited free rotation. To illustrate this, in FIG. 7a, it can be seen that all of the teeth 206, 210a-c and 212 are in a position of engagement so that clockwise rotation of the hub 200 results in positive engagement with the spool 110 so that the spool 110 will likewise rotate in a clockwise direction. As will be discussed more fully hereinafter, this clockwise rotation takes place when the cleaning ribbon 108 is being rewound onto the right take-up spool 110. However, if the hub 200 is rotated in the opposite direction (i.e. in a counterclockwise direction), the hub 200 can rotate freely for nearly four revolutions before the clutch assembly 214 again comes into positive engagement.

This can be seen by examining FIG. 7a through 7d in sequence. As the hub 200 makes one full revolution, it reaches the position of 7b so that lowermost tooth 206 engages the next upwardly adjacent tooth 210a. A second rotation of the hub 200 causes the lowermost ring 208 to rotate nearly a full revolution so that the tooth 210a comes into engagement with the next upwardly adjacent tooth 210b. (This position is shown in FIG. 7c.) A further revolution of the hub 200 carries both the rings 208a and 208b around for nearly a full revolution so that the tooth 210b comes into engagement with the tooth 210c. One further revolution of the hub 200 would bring the tooth 210c into engagement with the tooth 212. It is apparent that in that position, the spool 110 is then able to rotate counterclockwise nearly four full revolutions before the clutch mechanism 214 comes back into driving engagement which is shown in the position of FIG. 7a. As will be disclosed more fully hereinafter, this free rotation of the spool in a clockwise direction takes place with the third type of unit 10 described previously herein, when the cleaning ribbon is being unwound from the right spool 110 to be moved outwardly into its operating position.

Attention is now directed to FIGS. 7e and 7f where there is shown a retaining spring assembly positioned within the left side of the cassette housing 102 adjacent to the left side of the left locating spool 112. This spring assembly 216 has an engaged position, illustrated in FIG. 7e, and a disengaged position, illustrated in FIG. 7f.

The spring assembly 216 comprises an elongate leaf spring 218 having a forward end 220 that is restrained by three locating pins 222, 224 and 226. The three pins 222, 224 and 226 are positioned so as to anchor the forward end 220 and resist movement of the middle portion of the leaf spring 218 to the left. The lower end 228 of the spring 218 is located in a slot in an operating knob 230 that is rotatably mounted in the rear left corner of the housing 1021 The knob 230 has fixedly attached thereto a positioning member 232 having two detents 234 and 236 adapted to engage a locating pin 238. When the detent 236 is in engagement with the pin 238, as shown in FIG. 7e, the leaf spring 218 bears against the left side of the spool 112. The spool 112 has a peripheral protruding portion 240 which upon rotational movement of the spool 112 engages the leaf spring 218 so as to push it outwardly toward the left. Thus, it becomes apparent that the leaf spring 218 yieldingly resists the clockwise rotation of the spool 112 when the spring 218 is in the position of FIG. 7e.

When the knob 230 is moved to its second position so that the detent 234 engages the pin 238, the leaf spring 218 is bowed outwardly toward the left, as shown in FIG. 7f. With the spring 218 is located, the left spool 112 is able to rotate without any resistance from the spring 218.

To describe the operation of the cassette cleaner 100, let it be assumed that it is being used with the first type of unit 10 that was described previously herein. For that type of unit, the operating knob 230 is turned to the position shown in FIG. 7f so that the spring assembly 216 is in the disengaged position. Let it be assumed that the cartridge 106 is properly in place, as shown in FIG. 5. The first step is to properly position the cleaning ribbon 108 in the housing structure 102.

To position the ribbon 108 properly for its cleaning operation, first the cassette cleaner 100 is turned to position its bottom side up, as shown in FIG. 7. Next, the right spool 110 (which is at the left in FIG. 7) is rotated to take up all slack in the ribbon 108 so that the forward portion 120 of the ribbon 108 extends in a straight line across the front portion of the cleaner 100, as shown in FIGS. 7 and 8. Next, the left locating spool 112 (shown at the right side in FIG. 7) is turned in a direction which in FIG. 7 is clockwise, to wind a portion of the ribbon 108 onto the spool 112. The turning continues until the tab 160a engages the stop member 162. At this position, the cleaning ribbon 108 is in proper location for having the cleaning solution applied thereto.

To apply the cleaning solution, the front lid 128 is placed in its down position (as shown in FIG. 5) so that the front window 158 is positioned in front of the ribbon 108. A typical cleaning solution would be, for example, a solution of alcohol and a liquid fluorocarbon. The cleaning solution is applied in a conventional manner through the five windows 150 through 158 to the portions of the ribbon 108 that are exposed through these windows 150 through 158. For example, this can be done with an elongate applicator having a sponge-like member on its outer end that absorbs the cleaning fluid in a bottle and can deposit the cleaning fluid on the ribbon 108.

With the cleaning solution so applied through the windows 150 through 158, the forward lid 128 is raised and the cassette cleaner is placed into the recess 14 of the video unit 10.

The cassette cleaner 100, having its housing structure shaped substantially the same as a conventional tape cassette 16, readily fits into the recess 14. The cleaner 100 is provided with positioning holes 185 to fit with matching locating pins in the recess 14 of the unit 10. Immediately after being placed in the recess 14, the cassette cleaner 100 is in the position shown in FIG. 8, with the cleaning ribbon 108 being positioned immediately in front of the two guide elements 46 and 48, and also forward of the pinch roller 66 and the guide pin 72.

When the cassette cleaner 100 is placed in the recess 14, this immediately triggers the mechanism in the video unit 10 to cause the guide ring 44 to rotate counterclockwise and the locating arm 68 to swing forwardly about its pivot location 70. At the same time, the brake member 30 engages the drive ring 26 to hold the left spindle 20 and its associated locating spool 112 stationary. The stop member 164 insures that there is no rotation of the spool 112 until the limiting linkage moves to its to its forward position. This stop member 164 can shift forward moderately so that the matching stop member 166 on the spool 112 is able to move by the member 164 when the spool 112 is rotated in a counterclockwise direction, as seen in FIG. 8. With the two stop members 164 and 166 engaging one another (as shown in FIG. 8), clockwise rotation of the spool 112 is halted until the outward movement of the locating arm 68 moves the limiting linkage 114 outwardly (as shown in FIG. 9) to move the member 164 out of its stop position.

As the guide ring 44 rotates counterclockwise, the lead guide element 46 pulls the cleaning ribbon 108 forwardly so that it unwinds from the right spool 110, with the left spool 112 remaining stationary. In this first type of unit 10, the right sprocket is disengaged from its drive during this portion of the operation, so that the right spool 110 can rotate freely to unwind the ribbon 108. The guide ring 44 moves continuously through the position of FIG. 9 and finally comes to a halt at the location of FIG. 10. This brings the five wetted portions of the cleaning ribbon 108 into a position relative to the video head 32, the audio head 34, the capstan 64 and pinch roller 66 to begin the cleaning cycle. In FIG. 10, the five wetted areas are shown as darkened areas on the ribbon 108, and are given numerical designations corresponding to their previous window locations when in the retracted position, with an "a" suffix designating these as wetted areas. Thus, that portion of the ribbon 108 which was exposed at the window 150 in the position of FIG. 8 is given in FIG. 10 the designation 150a. In like manner, the portion of the ribbon 108 that was exposed at window 152 is designated in FIG. 10 as 152a, with this pattern being repeated up to the location of 158a.

With the ribbon positioned as in FIG. 10, the "play forward" key on the video unit 10 is depressed to cause the pinch roller 66 to move into engagement with the capstan 64 which is rotating in a counterclockwise direction, as seen in FIG. 10. At the same time, the right take-up spool 110 begins to rotate in a clockwise direction, and the brake member 30 moves out of engagement to permit rotation of the spool 112.

With reference to FIG. 10, where the ribbon 108 is positioned at the start of its cleaning cycle, it can be seen that the three wetted portions 158a, 156a and 154a are in contact with the surface 38 of the video head 32.

Also, the wetted tape portion 150a is just coming into engagement with the operating surface of the audio head 34. As soon as the player key on the video unit 10 is depressed, the video head begins to rotate at a relatively high rate of speed, thus enhancing the cleaning action of the wetted portions 158a, 156a and 154a. Also the pinch roller 66 presses the ribbon 108 against the capstan 64 to cause the linear travel of the ribbon through the unit 10.

Figure 11:
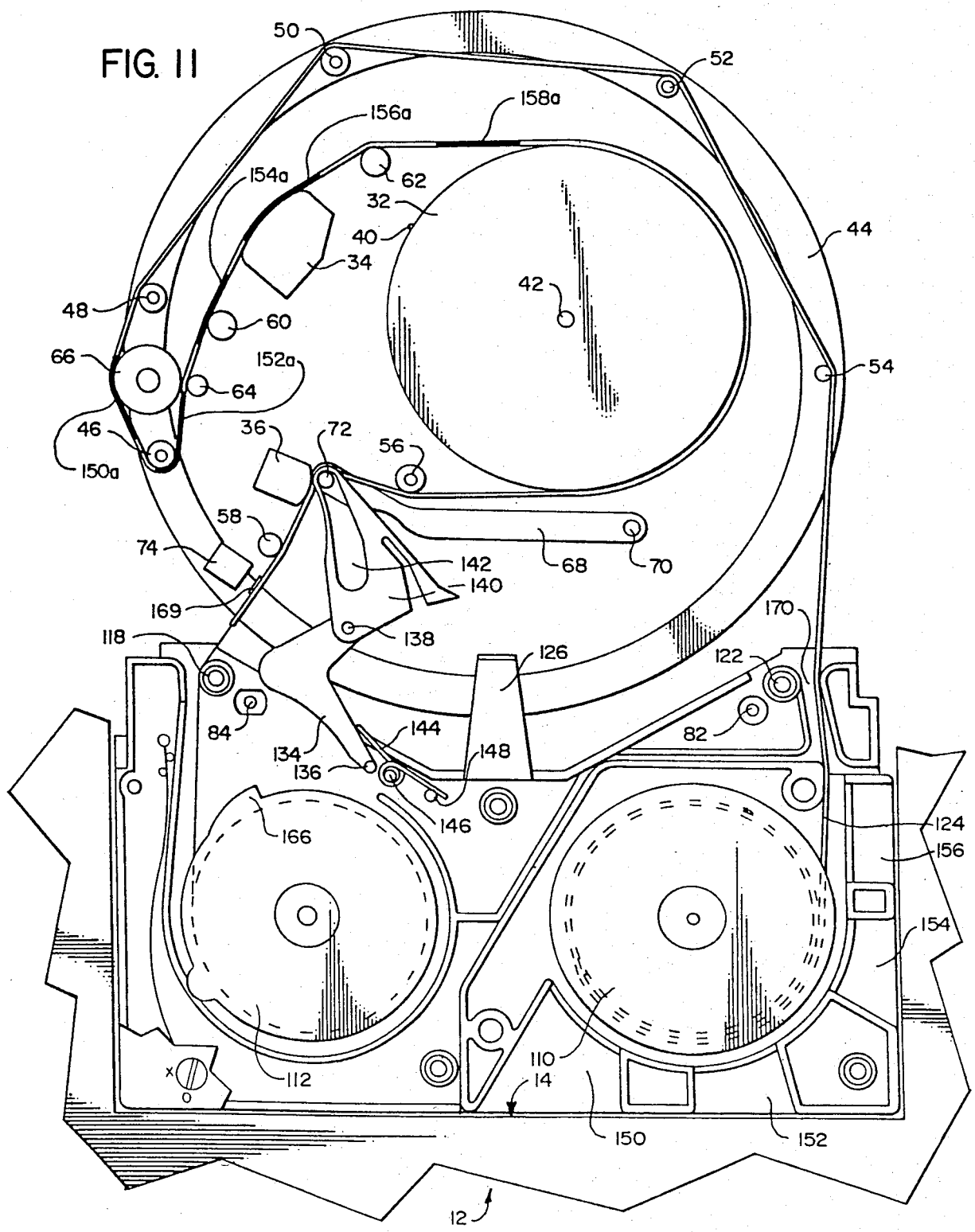
FIG. 11 is a view similar to FIG. 10, showing the cleaning ribbon completing its travel along its cleaning path.

The cleaning ribbon travels from the position of FIG. 10 approximately three to five inches along its length to the position of FIG. 11. It can be seen that the wetted portions of the ribbon 108 have moved past the audio head 34 and through the capstan 64 and pinch roller 66 to clean these components. At this time, the foil portion 169 passes adjacent the sensing element 74 to activate the shut-off mechanism so that the pinch roller 66 moves a short distance away from the capstan 64 to release the ribbon 108. Immediately after this, the guide ring rotates clockwise back to its original position of FIG. 8, and the right take-up spool turns clockwise to wind the ribbon 108 onto the spool 110. Also, the locating arm 68 retracts to the position of FIG. 8, with the linkage 114 also retracting, due to the action of the spring member 144.

When the various components are back to the position of FIG. 8, then the cassette cleaner 100 is simply removed from the recess 14. To prepare the cleaner 100 for a subsequent operation, it is simply turned over and the spool 112 rotated to the position shown in FIG. 7. After that, the ribbon 108 at the various locations can again be wetted and a subsequent cleaning cycle can be accomplished as described above.

With reference to FIGS. 12 through 15, the operation of the present invention will now be described as it is used in the second type of video player/recorder unit described previously herein. It will be recalled from that earlier description that the head 32 begins rotating as the cleaning ribbon is being moved outwardly into engagement with the head 32. Also, as previously described, in this second type of video player/recorder unit, the brake member 30 is either non-existent or exerts a brake force which is in some instances not adequate to provide adequate braking for the drive member 20.

Figure 12:
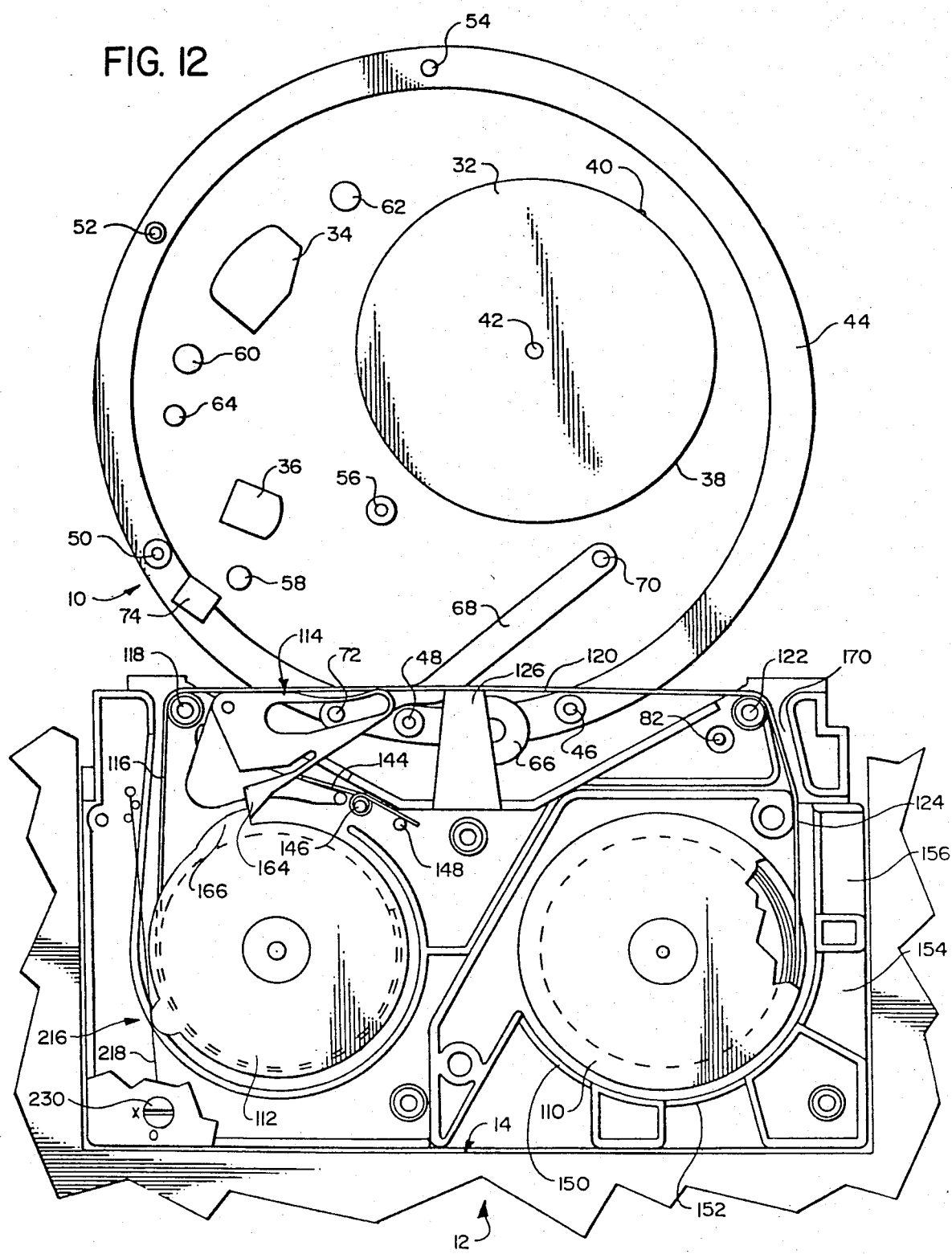
FIGS. 12 through 15 are views similar to FIGS. 8 through 11, respectively, but showing the device of the present invention installed in a second and third type of the video player/recorder unit of FIG. 1, and with the top cover removed for purposes of illustration.
Figure 13:
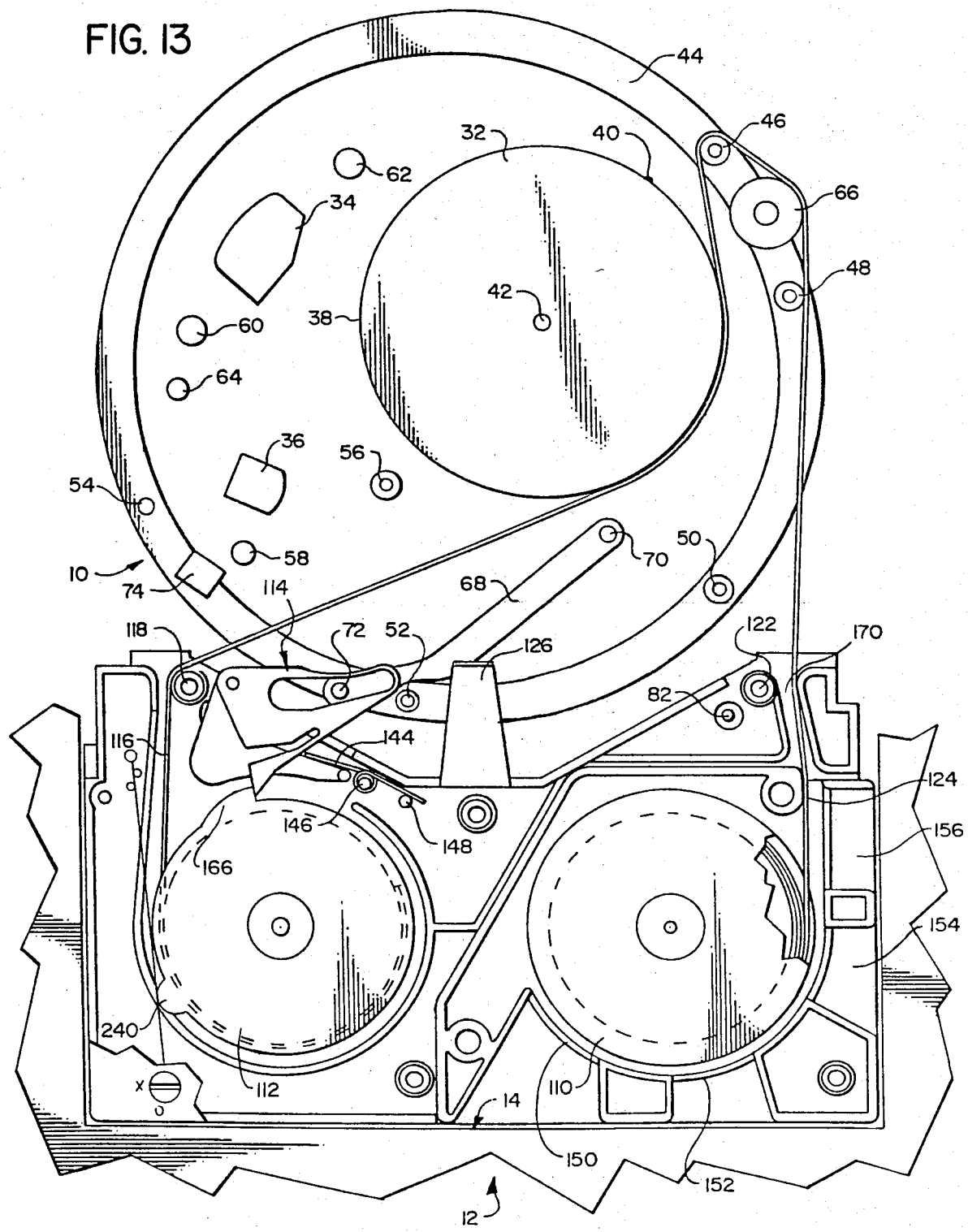
Figure 14:
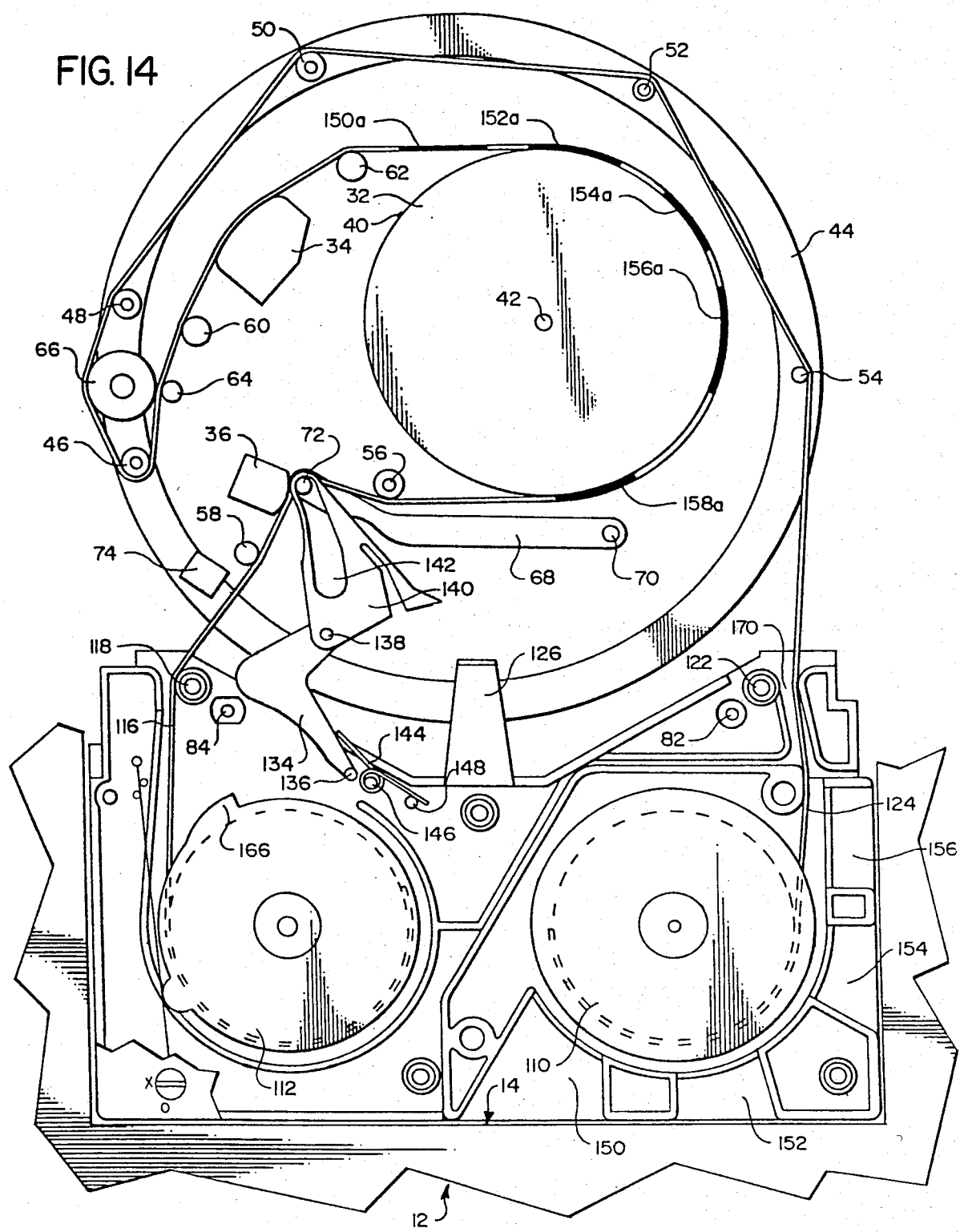
Figure 15:
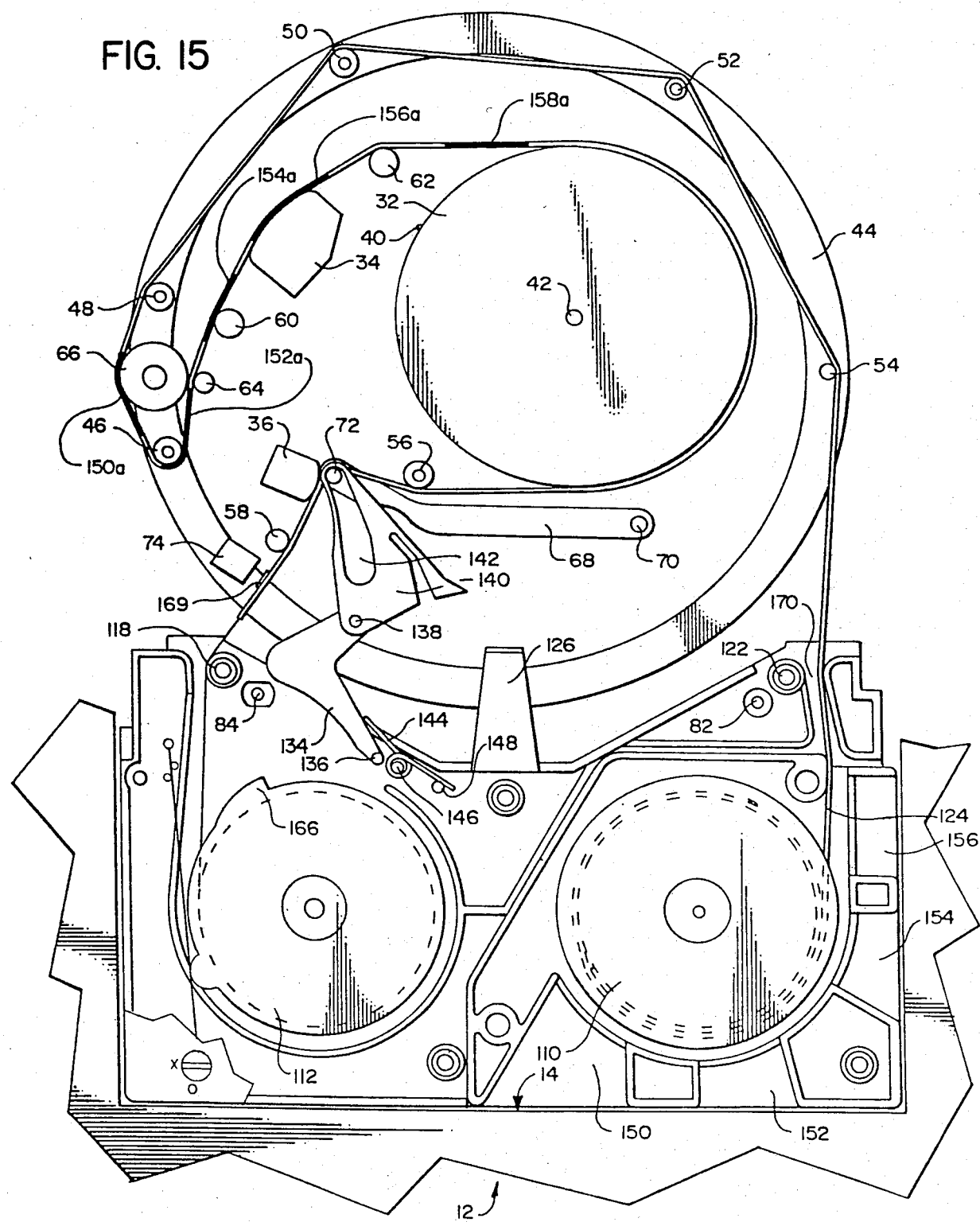
Figure 16:
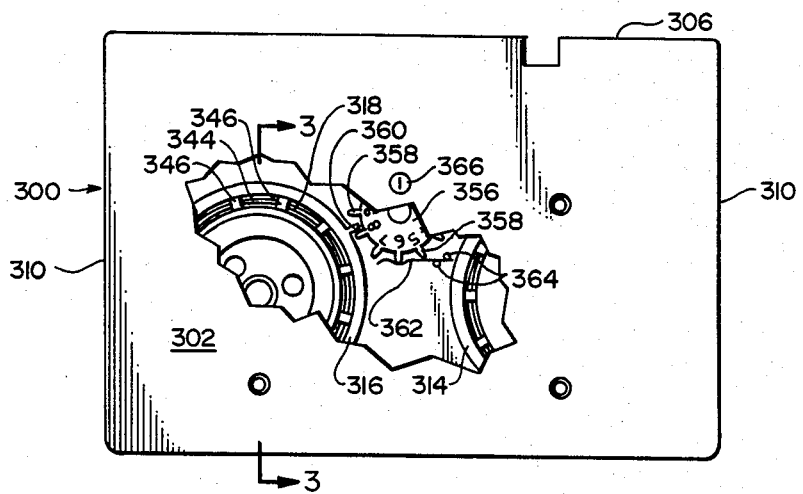
FIG. 16 is a top plan view of a cleaning device of a second embodiment of the present invention, with a portion of the cover of the housing broken away for purposes of illustration.
Figure 17:
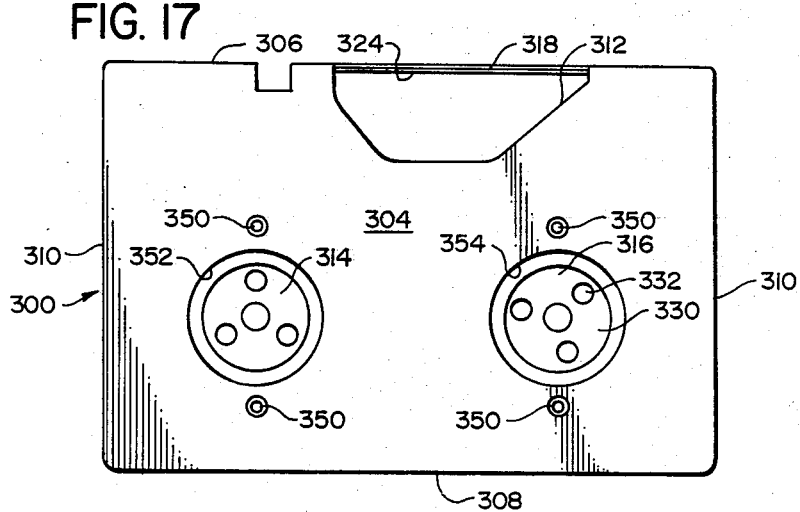
FIG. 17 is a bottom plan view of the device shown in FIG. 1.

As illustrated in FIG. 12, for utilizing the cassette cleaner 100 with this second type of unit 10, the spring assembly 216 is moved to the engaged position, where the leaf spring 218 resists initial rotational movement of the spool 112 in a clockwise direction. In other respects, the operation of the cassette cleaner 100 as illustrated in FIGS. 12 through 15 is quite similar to the operation of the unit as shown in FIGS. 8 through 11. As can be seen in FIG. 13, as the ring 44 is rotating to move the cleaning ribbon 108 outwardly, the arm 68 remains in its retracted position. Very shortly after that, the arm 68 begins to move outwardly and move the stop member 164 out of engagement with the mating stop member 166. Since the cleaning ribbon 108 is still being extended, there is a tension on the ribbon 108 to tend to unwind it from the spool 112 in addition to unwinding it from the spool 110. This is resisted by the spring member 218 bearing against the protruding member 240 on the spool 112. When the ribbon 108 is fully extended as shown in FIG. 14, the next operation is to depress the player key so that the cleaning ribbon is engaged by the capstan 64 and pinch roller 66 and caused to move through the unit 10. This places an increased tension load on the ribbon 108 that is at the spool 112, and this is sufficient to overcome the action of the spring 218. Thus, the cleaning ribbon unwinds from the spool 112 as the spool 112 rotates, and the ribbon continues on through its cleaning cycle to the position of FIG. 15. Thereafter, the cleaning ribbon is retracted in the same manner as described before with reference to the description of the operation of the cassette cleaner 100 in the first type of unit 10.

The reason that the spring member 218 remains disengaged from the spool 112 in operation with the first type of unit 10 (as seen in FIGS. 8 through 11) is that the rotation of the head 32 is delayed until the ribbon 108 is fully extended and the player key is depressed. When the player key is depressed to begin rotation of the head 32 and also cause the capstan 64 and pinch roller 66 to come into engagement to pull on the ribbon 108, if there is a sufficiently large restraining force on the spool 112, this will increase the tension on the ribbon 108 to cause it to press with greater force against the head 32. If the head 32 feels too much resistance against its rotation, this triggers an automatic shut-off mechanism in the unit 10.

However, with the second type of unit 10, since the head 32 is already rotating at a relatively high speed when the capstan 64 and pinch roller 66 become engaged, the resulting force against the head 32 is not sufficiently great to trigger the shut-off mechanism in that particular unit. Therefore, the spring member 218 can remain engaged.

The operation of the cassette cleaner 100 in the third type of video player/recorder unit 10 described previously herein will now be disclosed with further reference to FIGS. 12 through 15. As described earlier, the third type of unit 10 is so arranged that when the playing tape from a conventional tape cassette is withdrawn from the tape cassette, the right drive spindle 18 remains stationary, and the tape is unwound from the left spool 80. However, if this were to occur when the cassette cleaner 100 were placed in operating position in the unit 10, the wetted cleaning portion of the ribbon 108 would remain in the cassette housing 102. To alleviate this situation, the aforementioned clutch assembly 214 is provided.

To prepare the cassette cleaner 100 for insertion into the recess 14 of the housing 12 of the unit 10, the cassette cleaner is turned over so that its bottom surface is exposed, as shown in FIG. 7. Then the spool 112 is rotated clockwise (as described earlier with regard to operation of the first type of unit 10) until the tab 160a is able to engage the stop member 162. Then the spool 110 is, as seen in FIG. 7, rotated counterclockwise to take up any slack in the cleaning ribbon 108. Then the hub 200 is rotated in a clockwise direction until the clutch teeth 206, 210a–210c and 212 come into engagement. By doing this, the spool 110 is arranged relative to the hub 200 so that the spool 110 can rotate freely nearly four fill revolutions in an unwind direction while the hub 200 remains stationary.

Then, the cassette cleaner 100 is placed in the recess 14 of the unit 10 in the manner described previously. Also, the spring assembly 216 is placed in its retaining position, as shown in FIGS. 12 through 15. Then the player key of the unit 10 is depressed to cause the ring 44 to rotate and pull the ribbon 108 outwardly into its operating position. Since the spring member 218 engages the protrusion 240 on the spool 112, the spool 112 does not initially rotate. However, since the clutch mechanism 214 permits free rotation of the right spool 110 for several revolutions, the cleaning ribbon 108 unwinds from the spool 110.

With the ribbon 108 in the position shown in FIG. 14, the player key of the unit 10 is depressed to cause the capstan 64 and pinch roller 66 to engage the ribbon 108 and move it through its cleaning cycle. At the same time, the right drive sprocket 18 begins to rotate and thus cause the clutch mechanism 214 to engage to wind the ribbon 108 back onto the right spool 110. At the completion of the cleaning cycle, the unit 10 is operated to cause the ring 44 to rotate and permit the ribbon 108 to be retracted, and at the same time, the spool 110 is rotated by the drive sprocket to wind the ribbon 108 onto the spool 110.

FIGS. 16 thru 21 illustrate a second embodiment of the present invention. There is a cassette housing 300 having the same general configuration of a tape cassette adapted to fit into the player/recorder. This housing 300 has a top wall 302, a bottom wall 304, a front wall 306, a rear wall 308 and two side walls 310. The right portion of the front wall 306 is cut away and the adjacent part of the bottom wall 304 is recessed at 312 to accomodate guide members currently existing in conventional player/recorders.

Mounted in the housing 300 are substantially identical right and left spools 314 and 316, respectively. A cleaning ribbon 318 is wound on each of the spools 314 and 316 so as to extend forwardly from each and through openings in the front wall 306 on opposite sides of the recess 312. Thus, the forward portion of the ribbon 318 extends at 324 across the front part of the housing 300 just forwardly of the recess 312. The ribbon 318 has sufficient length so that the opposite ends of the ribbon can each be wound approximately four to six times around both spools 314 and 316.

Figure 18:
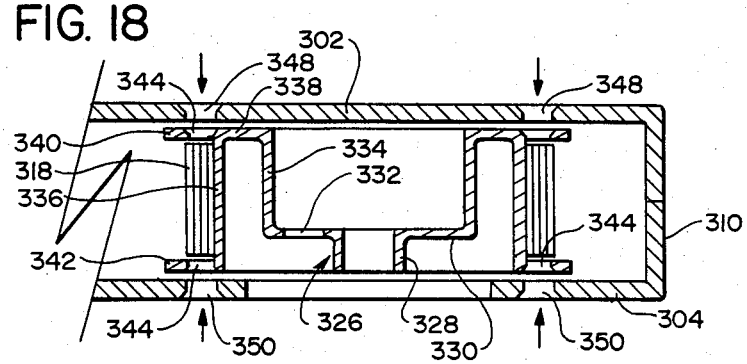
FIG. 18 is a sectional view taken along line 18—18 of FIG. 16.

It can be seen, with references to FIG. 18 that each spool 314 or 316 comprises a hub portion 326 having a lower tubular portion 328 of relatively small diameter and a disk portion 330 which has three holes 332 formed therein to receive drive elements of the player/recorder. Connected to the hub portion 326 is the outer portion of the spool 314 or 316, this outer portion comprising an inner cylindrical wall 334 and an outer cylindrical wall 336 rigidly interconnected at their upper edges by an annular portion 338. Upper and lower annular flanges 340 and 342 extend outwardly from the outer wall 336 to form an annular recess in which the cleaning ribbon 318 can be wound. Each of the flanges 340 and 342 is formed with a plurality of evenly spaced arcuately shaped access openings 344, separated from one another by spoke members 346 of relatively short arcuate width. Also, the top wall 302 and the bottom wall 304 are each formed with a pair of diametrically opposed, vertically aligned access openings 348 and 350, respectively. These openings 348 and 350 are positioned directly above and below, respectively, the flanges 340 and 342 of their related spool 314 or 316 so as to be in vertical alignment with the spool access openings 344 that are positioned at any time adjacent the openings 348 and 350. Thus, when cleaning fluid is poured through the access openings 348 and/or 350, those portions of the cleaning ribbon 318 positioned between a pair of access openings 348 and 350 are wetted with the cleaning solution, while the other portions of the ribbon 318 remain dry.

Also, there is formed in the bottom wall 304 of the housing 300 right and left circular openings 352 and 354, respectively, at the location of the hub portions 326 of the right and left spools 314 and 316. These openings 352 and 354 permit the drive elements of the playing and/or recording apparatus to engage the hub portion 326. In the particular configuration shown herein, the two pair of diametrically opposed bottom access openings 350 are on opposite sides of the openings 352 and 354.

To indicate the location of the ribbon 318 on the two spools 314 and 316, there is provided a dial member 356 rotatably mounted in the center part of the housing 300. This dial 356 has a plurality of circumferentially spaced teeth 358 arranged to engage a single tooth 360 positioned on the periphery of the left spool 316. The dial member 356 is yieldingly held in any one position by a leaf spring 362 mounted in the housing by a pair of pins 364.

When the spool 316 makes a single revolution, it engages an adjacent tooth 358 to move the dial 346 an increment of travel equal to the spacing of an adjacent pair of teeth 358. After such increment of travel, the spring 362 engages the next adjacent tooth 358 to hold the dial 356 in the new position. Each of the teeth are numbered sequentially, and there is an indicating opening 366 in the top wall 302, this opening 366 being positioned to show the number adjacent the most forward positioned tooth 358. Thus, as shown in FIG. 1, the numeral "1" appears in the window 366. When the numeral "1" appears in the window 366, this is an indication that the ribbon 318 is wound on each of the spools 314 and 316 the proper number of turns so that the ribbon 318 is in its proper pre-cleaning position.

To describe the operation of this second embodiment, first, the two spools 314 and 316 are rotated so that the ribbon 318 is in its proper pre-cleaning position, as indicated by the numeral "1" appearing in the window 366 (in the manner described immediately above). In this position, the ribbon is wound equally on the two spools 314 and 316. The next step is to apply the cleaning solution to the appropriate set of access holes 348 and 350. This will depend upon the characteristics of the playing and/or recording apparatus with which the unit is used. In the unit 370 which is shown only partially in FIG. 19, the normal mode of operation is for the playing tape to be unwound from the right spool of the tape cassette. Thus, for that particular unit 370, the cleaning solution is first poured through the right set of top holes 348; the housing 300 is then turned over so that the bottom side 304 is up; and cleaning solution is also poured through the two right bottom holes 350.

As a result of the two sets of holes 348 and 350 being diametrically opposed, the cleaning solution is applied to the ribbon at circumferentially spaced locations. Also, since in the pre-cleaning position, the ribbon is wound approximately four to six times around the spool 314, the cleaning solution is applied to at least eight locations on the ribbon 318.

The housing 300 is then placed in the player/recorder unit 370, and the unit is operated to cause the guide members 371 of the unit 370 to engage the forward ribbon portion 324 and to carry it in a path around and in engagement with the playing head 372. Then the unit is operated to cause the capstan 374 and pinch roller 376 to engage the ribbon 318 and cause the ribbon 318 to move through the unit 370. At the same time, the drive units of the unit 370 cause the spools 314 and 315 to rotate in accordance with the direction of travel of the ribbon 318. This causes the portions of the ribbon 318 that are wetted with the cleaning solution (these being indicated at 378) to move past the various components of the unit 370 to cause a cleaning action of the same. The alternate engagement of first a wetted portion of the ribbon and then a dry portion of the ribbon 318 against the various components of the unit 370 causes in effect a wetting and drying operation which enhances the cleaning of the head 372 and the other components.

To complete the cleaning cycle, the ribbon 318 is provided with a shut-off portion (e.g. either a transparent portion or a metallic portion) to cause the unit 370 to move the guide members 371 back to the retracted position. At the same time, one or both of these spools 314 and 316 are rotated by the drive elements of the unit 370 to wind the ribbon 318 into the housing 300.

One of the problems with providing a cleaning device for video player/recorders is that the various units quite often differ from one another in the manner in which the playing tape is unwound from the spools. Some unwind from the right spool and some from the left spool. This second embodiment uniquely solves this problem by permitting the ribbon 318 to be wetted with a cleaning solution at the location of either or both the right and left spools 314 and 316, and permitting the ribbon 318 to be unwound from either spool 314 or 316.

A modification of the second embodiment is illustrated in FIG. 21. Instead of using the dial member 356 to indicate location of the ribbon 318, its is possible simply to place indicia (e.g. numerals) on the exposed surface of the ribbon 318 itself at spaced locations along its length. When a certain numerical value appears at the forward exposed portion 324 the ribbon 318, the user then knows that the ribbon 318 is in its proper pre-cleaning position. For example, as illustrated in FIG. 21, the numeral "4" appears at the opening 316. The user simply rotates the spools 314 and 316 appropriately until the proper numerical value (e.g. "0") appears in the location of the opening 316. Then the ribbon 318 is in its proper pre-cleaning position.

What is claimed is:
1. A cleaning apparatus for a playing and/or recording machine, where said machine has:
 a. a structure defining a recess to receive a tape cassette, said recess having a forward portion to receive a front portion of said cassette, and a rear portion to receive a rear portion of said cassette;
 b. a rotating head member having a curved peripheral surface;
 c. a guide means movable between a first nonoperating position and a second operating position, said guide means arranged so that with a tape cassette in the recess, the guide means in moving from the nonoperating to the operating position engages a tape portion positioned along the front portion of the cassette and moves the tape portion outwardly from the cassette into an operating position extending in a curved path along the peripheral surface of the head;
said apparatus comprising:
 a. a housing having a front portion, a back portion, first and second side portions, a top wall and a bottom wall, said housing being adapted to be positioned in the recess of the machine;
 b. first and second spools rotatably mounted in the first and second side portions of the housing, respectively;
 c. a cleaning ribbon having a first end portion connected to said first spool, a main cleaning portion having a front ribbon portion which extends along the front portion of the housing, and a second end portion connected between the main cleaning portion and the second spool, said ribbon having sufficient length so that the ribbon can be wound in a plurality of loop portions around either of said spools, the front ribbon portion being positioned to be engaged by the guide means so as to be extracted by the guide means from the housing to bring the main cleaning portion into cleaning engagement with the rotating head member;

d. first and second access opening means located in said housing proximate to said first and second spools and exposing ribbon loop portions wound on said first and second spools, respectively, each of said access opening means exposing segments of the ribbon loop portions wound on the spools for application of a cleaning solution on said segments in a spaced pattern along said ribbon loop portions;

whereby said ribbon loop portions can be located on either of said spools and be exposed for application of a cleaning solution, so that regardless of which spool has the ribbon unwound therefrom during a cleaning cycle, wetted ribbon portions can be placed in cleaning engagement with the head member.

2. The apparatus as recited in claim 1, wherein each of said first and second access opening means is located in at least one of said top and bottom walls, whereby a plurality of said ribbon loop portions can be exposed to said access opening means so that a plurality of loop segments can be wetted on said plurality of ribbon loop portions.

3. The apparatus as recited in claim 2, wherein said access opening means is located in both said bottom and top walls, whereby a cleaning solution can be applied to both edge portions of segments of the ribbon loop portions for more uniform wetting of said segments.

4. The apparatus as recited in claim 3, wherein said access opening means comprises a plurality of openings in each of said top and bottom walls at each spool location.

5. The apparatus as recited in claim 3, wherein the main cleaning portion of the ribbon has sufficient length so that it can be wound in a plurality of loops around both of said first and second spools, whereby a cleaning solution could be applied to ribbon portions wound on both of said spools so that wetted ribbon portions would come into cleaning engagement with the head, regardless of which spool had the ribbon being unwound therefrom.

6. The apparatus as recited in claim 1, wherein the main cleaning portion of the ribbon has sufficient length so that it can be wound in a plurality of loops around both of said first and second spools, whereby a cleaning solution could be applied to ribbon portions wound on both of said spools so that wetted ribbon portions would come into cleaning engagement with the head, regardless of which spool had the ribbon being unwound therefrom.

7. The apparatus as recited in claim 1, further comprising locating means to position said ribbon and said spools in a precleaning position.

8. The apparatus as recited in claim 7, wherein said locating means comprises an indicating member operatively connected to at least one of said spools in a manner that rotation of one of said spools moves said indicating member to show position of the ribbon relative to the spool.

9. The apparatus as recited in claim 8, wherein said locating means comprises a dial member which is operatively connected to said at least one of said spools in a manner to rotate through increments of rotation in response to rotation to said at least one of said spools.

10. The apparatus as recited in claim 7, wherein said locating means comprises indicia on said ribbon to indicate position of said ribbon relative to the precleaning position of the ribbon.

11. The apparatus as recited in claim 7, wherein said locating means comprises cooperating stop means which come into engagement when said spools have been rotated from their precleaning position.

12. A cleaning apparatus for a playing and/or recording machine, where said machine has:

a. a structure defining a recess to receive a tape cassette, said recess having a forward portion to receive a front portion of said cassette, and a rear portion to receive a rear portion of said cassette;

b. a rotating head member having a curved peripheral surface;

c. a guide means movable between a first nonoperating position and a second operating position, said guide means arranged so that with a tape cassette in the recess, the guide means in moving from the nonoperating to the operating position engages a tape portion positioned along the front portion of the cassette and moves the tape portion outwardly from the cassette into an operating position extending in a curved path along the peripheral surface of the head;

d. a power system to move the tape through the apparatus;

said apparatus comprising:

a. a housing having a front portion, a back portion, first and second side portions, a top wall and a bottom wall, said housing being adapted to be positioned in the recess of the machine;

b. first and second spools rotatably mounted in the first and second side portions of the housing, respectively;

c. a cleaning ribbon having a first end portion connected to said first spool, a main cleaning portion having a front ribbon portion which extends along the front portion of the housing, and a second end portion connected between the main cleaning portion and the second spool, said ribbon having sufficient length so that the ribbon can be wound in a plurality of loop portions around at least one of said spools, the front ribbon portion being positioned to be engaged by the guide means so as to be extracted by the guide means from the housing to bring the main cleaning portion into cleaning engagement with the rotating head member;

d. access opening means located in said housing proximate to at least said second spool and exposing ribbon loop portions wound on said second spool, said access opening means exposing segments of the ribbon loop portions wound on the second spool for application of a cleaning solution on said segments in a spaced pattern along said ribbon loop portions;

e. said second spool being rotatable in a first unwind direction to unwind the ribbon therefrom, and being rotatable in a second wind direction to wind ribbon thereon;

f. clutch means adapted to operatively engage said second spool in a manner to rotate said second spool in said second direction, and to permit at least limited relatively free rotation in said first direction;

g. said guide means being arranged so that in the first non-operating position the guide means in moving from its first position engages the front ribbon portion and moves the ribbon outwardly into cleaning engagement with the head member, with the power system of the apparatus being able to cause the ribbon to move relative to the head through a cleaning cycle.

13. The apparatus as recited in claim 12, wherein said clutch means comprises at least one rotating clutch element having at least limited free rotational travel to an engaged position.

14. The apparatus as recited in claim 13, wherein said clutch means has relatively rotatable tooth elements to engage one another in clutching engagement.

15. The apparatus as recited in claim 12, wherein said clutch means comprises at least a first clutch member connected to said second spool and a second clutch member adapted to engage a drive member of said apparatus, said two clutch members having first and second tooth means located for driving engagement, and also located for at least limited free relative rotation.

16. The apparatus as recited in claim 15, wherein said clutch means comprises at least a third intermediate clutch member having third tooth means interengaging between said first and second tooth means while permitting relative rotation of each of said first and second clutch members relative to said third clutch member.

17. The apparatus as recited in claim 12, wherein said clutch member comprises a hub adapted to engage a drive sprocket of said apparatus, said hub having a first clutch tooth, a ring member mounted for rotation relative to said hub and having a second clutch tooth adapted to engage the first clutch tooth, a third clutch tooth mounted to said first spool in a manner to be able to come into operative engagement with said second clutch tooth.

18. The apparatus as recited in claim 7, wherein there is a plurality of clutch rings having corresponding clutch teeth, in operative engagement between said first and third clutch teeth.

19. The apparatus as recited in claim 18, further comprising restraining means adapted to provide a moderate resisting force to rotation of said first spool while said guide means of the apparatus is moving toward its second operating position.

20. The apparatus as recited in claim 19, wherein said restraining means has a first engaged position to provide said moderate resisting force and a second disengaged position to permit relative free rotation of said first spool, whereby said restraining means can be positioned to accommodate different operating characteristics of the apparatus to which the device is applied.

21. The apparatus as recited in claim 20, wherein said restraining means comprises spring means which exerts a yielding restraining force against said first spool.

22. The apparatus as recited in claim 21, wherein said first spool has a restraining element mounted thereon, and said restraining means is positioned to engage said restraining element.

23. The apparatus as recited in claim 21, wherein said spring means comprises a leaf spring anchored to said housing so as to bear against said first spool in the first engaged position and to be out of restraining relationship with said first spool in said second disengaged position.

24. The apparatus as recited in claim 20, wherein said restraining means comprises an elongate spring having a first end anchored to said housing, and a second end connected to a positioning member, said positioning member having a first position where said spring is held against said second spool so as to exert said resisting force, said positioning member being movable to a second position to move said spring member out of restraining engagement with said spool.

25. The apparatus as recited in claim 24, wherein said positioning member is rotatably mounted in said housing, the first end of said spring being restrained from rotation by mounting means in said housing, the second end of said spring being mounted to said positioning member so as to be rotatable therewith, whereby rotation of said positioning member causes said spring member to have a middle portion thereof be moved into and out of its restraining position.

26. The apparatus as recited in claim 12, further comprising restraining means adapted to provide a moderate resisting force to rotation of said first spool while said guide means of the apparatus is moving toward its second operating position.

27. The apparatus as recited in claim 26, wherein said restraining means has a first engaged position to provide said moderate resisting force and a second disengaged position to permit relative free rotation of said first spool, whereby said restraining means can be positioned to accommodate different operating characteristics of the apparatus to which the device is applied.

28. The apparatus as recited in claim 27, wherein said restraining means comprises spring means which exerts a yielding restraining force against said first spool.

29. The apparatus as recited in claim 28, wherein said first spool has a restraining element mounted thereon, and said restraining means is positioned to engage said restraining element.

30. The apparatus as recited in claim 28, wherein said spring means comprises a leaf spring anchored to said housing so as to bear against said first spool in the first engaged position and to be out of restraining relationship with said first spool in said second disengaged position.

31. The apparatus as recited in claim 27, wherein said restraining means comprises an elongate spring having a first end anchored to said housing, and a second end connected to a positioning member, said positioning member having a first position where said spring is held against said second spool so as to exert said resisting force, said positioning member being movable to a second position to move said spring member out of restraining engagement with said spool.

* * * * *